US009571472B2

(12) United States Patent
Pochuev et al.

(10) Patent No.: US 9,571,472 B2
(45) Date of Patent: Feb. 14, 2017

(54) ESTABLISHING AN INITIAL ROOT OF TRUST FOR INDIVIDUAL COMPONENTS OF A DISTRIBUTED SECURITY INFRASTRUCTURE

(71) Applicant: CRYPTOGRAPHY RESEARCH, INC., San Francisco, CA (US)

(72) Inventors: Denis Alexandrovich Pochuev, San Francisco, CA (US); Yogesh Swami, Mountain View, CA (US); Daniel O'Loughlin, Aptos, CA (US)

(73) Assignee: CRYPTOGRAPHY RESEARCH, INC., Sunnyvale, CA (US)

( * ) Notice: Subject to any disclaimer, the term of this patent is extended or adjusted under 35 U.S.C. 154(b) by 85 days.

(21) Appl. No.: 14/535,191

(22) Filed: Nov. 6, 2014

(65) Prior Publication Data

US 2015/0326543 A1    Nov. 12, 2015

Related U.S. Application Data

(60) Provisional application No. 61/989,373, filed on May 6, 2014.

(51) Int. Cl.
*H04L 29/06* (2006.01)
*H04L 9/14* (2006.01)
(Continued)

(52) U.S. Cl.
CPC ........... *H04L 63/0442* (2013.01); *G06F 21/57* (2013.01); *H04L 9/14* (2013.01); *H04W 12/04* (2013.01);
(Continued)

(58) Field of Classification Search
CPC .................................................. H04L 63/0442
(Continued)

(56) References Cited

U.S. PATENT DOCUMENTS 5,938,774 A * 8/1999 Hsu ........................... G06F 8/66
                                                                    714/10
8,843,764 B2   9/2014 Hussain
(Continued)

OTHER PUBLICATIONS

PCT International Search Report dated Jul. 9, 2015 in International Application No. PCT/US2015/028944. 10 pages.

*Primary Examiner* — Dant Shaifer Harriman
(74) *Attorney, Agent, or Firm* — Lowenstein Sandler LLP

(57) ABSTRACT

The embodiments described herein describe technologies for a device definition process to establish a unique identity and a root of trust of a cryptographic manager (CM) device, the CM device to be deployed in a CM system. The device definition process can take place in a device definition phase of a manufacturing lifecycle of the CM device. One implementation includes a non-transitory storage medium to store an initialization application that, when executed by a CM device, causes the CM device to perform a device definition process to generate a device definition request to establish the unique identity and the root of trust. In response to the device definition request, the initialization application obtains device identity and device credentials of the CM device and stores the device definition request in storage space of a removable storage device. The initialization application imports a device definition response containing provisioning information generated by a provisioning device of a cryptographic manager system in response to the device definition request.

24 Claims, 12 Drawing Sheets

(51) Int. Cl.
*G06F 21/57* (2013.01)
*H04W 12/04* (2009.01)
*H04L 12/24* (2006.01)

(52) U.S. Cl.
CPC ........ *H04L 41/0806* (2013.01); *H04L 2209/24* (2013.01)

(58) Field of Classification Search
USPC .......................................................... 713/155
See application file for complete search history.

(56) References Cited

U.S. PATENT DOCUMENTS

| | | |
|---|---|---|
| 2003/0063750 A1 | 4/2003 | Medvinsky et al. |
| 2004/0044903 A1* | 3/2004 | Komatsu .................. G06F 21/30 726/35 |
| 2007/0055867 A1 | 3/2007 | Kanungo et al. |
| 2009/0082004 A1* | 3/2009 | Duggal ............... H04L 12/1485 455/419 |
| 2009/0086977 A1 | 4/2009 | Berggren |
| 2009/0138708 A1* | 5/2009 | Miyazaki ................ H04L 63/12 713/168 |
| 2013/0318343 A1 | 11/2013 | Bjarnason et al. |
| 2014/0323092 A1* | 10/2014 | Jain .................. G06K 19/07739 455/411 |

* cited by examiner

ESTABLISHING AN INITIAL ROOT OF TRUST FOR INDIVIDUAL COMPONENTS OF A DISTRIBUTED SECURITY INFRASTRUCTURE

RELATED APPLICATIONS

This application claims the benefit of U.S. Provisional Application No. 61/989,373, filed May 6, 2014, the entire contents of which are incorporated by reference.

BACKGROUND

Presently, system-on-a-chip (SoC) vendors may sell many different varieties of the same "integrated circuit" (also referred to as "chip" or "IC"), where each variety is configured for a particular application. IC configuration often occurs by blowing one or more fuses or otherwise programming a one-time programmable memory on the IC. This type of IC configuration is generally a one-way process and cannot be undone. One method of circumventing the permanence of the configuration process is to add redundant or spare bits within the one-time programmable memory that can be combined to modify a previous setting (e.g., by exclusive-ORing multiple bits together to produce the final configuration setting). This type of redundancy has limited flexibility, however, and requires additional fuses which take up additional real estate on the IC. In addition, having multiple fuses behind a setting does not remove the need to perform multiple programming steps to configure ICs adds cost. Likewise, configurations today continue to be performed by IC vendors (or their contractors), who then maintain inventories of ICs with multiple fuse configurations.

The stockpiling of the different varieties of the same IC is often inefficient. For example, stockpiled ICs configured for a particular application are potentially wasted if they were overproduced or if customers' IC configuration needs change. Additionally, in some cases order fulfillment can be delayed if inventory of the configured ICs is insufficient to meet the demand. Moreover, the present model of configuration by the IC vendor can limit the range of business relationships and revenue streams practical between IC vendors and downstream customers. For example, the present model may limit the ability to generate future revenue from reconfiguration of ICs after their initial sale. If a downstream customer wishes to obtain features beyond the configured feature set, current ICs typically lack means for unlocking this functionality and there is therefore no opportunity to use downstream feature enablement as a revenue stream.

Moreover, the need for secure systems and applications is growing. Presently, allegedly secure ICs are often programmed with security keys on the factory floor. Secure keys may be used in a variety of ways, such as, for example, to protect stored data, control access to digital content, or encrypt/authenticate data used in transactions. Today, these keys can be stored in a one-time programmable memory, which may hold keys directly or hold a base key that is used with cryptographic functions that derivative keys for various functions. Typically, security is provided by performing the key loading process in a secured facility.

BRIEF DESCRIPTION OF THE DRAWINGS

The present disclosure is illustrated by way of example, and not by way of limitation, in the figures of the accompanying drawings.

DETAILED DESCRIPTION

Figure 1:
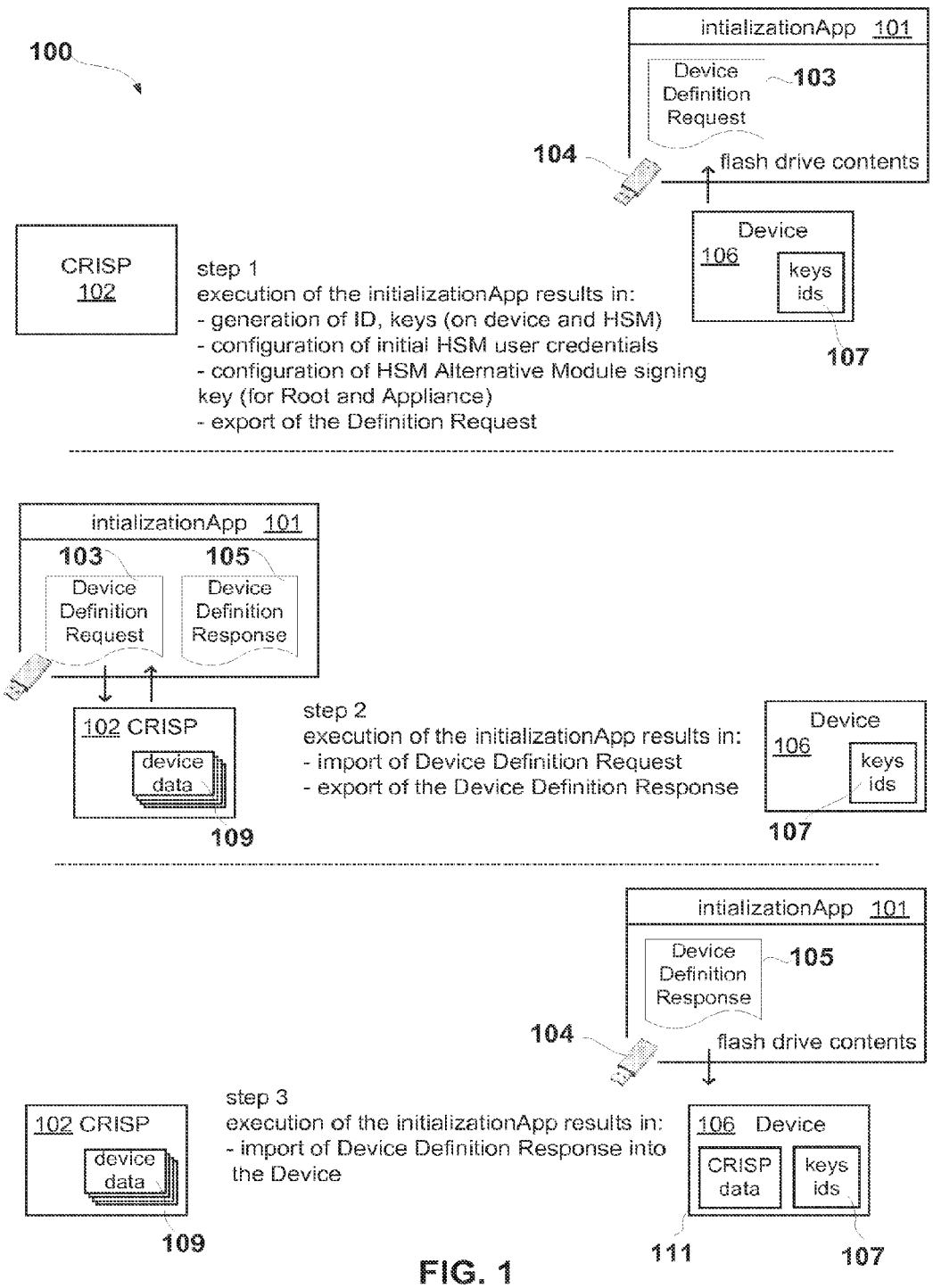
FIG. 1 is a diagram illustrating a device initialization process performed by an initialization application of a provisioning device associated with a cryptographic manager (CM) system according to one embodiment

The embodiments described herein describe technologies for a device definition process to establish a unique identity and a root of trust of a CM device, the CM device to be deployed in a CM system. The device definition process can take place in a device definition phase of a manufacturing lifecycle of the CM device. The device definition process is an initial provisioning process that generates and provisions credentials to provide confidentiality, data integrity and authentication of the CM device in one or more stages of the manufacturing lifecycle. One implementation includes a removable storage device to store an initialization application that, when executed by a CM device, causes the CM device to perform a device definition process to generate a device definition request to establish the unique identity and the root of trust. In response to the device definition request, the initialization application obtains device identity and device credentials of the CM device and stores the device definition request in storage space of the removable storage device. The initialization application import a device definition response containing provisioning information generated by a provisioning device of a cryptographic manager (or CryptoManager) (CM) system in response to the device definition request.

A CM security device typically consists of a rack mounted server with an integrated Hardware Security Module and software. Following the device manufacture lifecycle these Devices are deployed into the field to untrusted data centers.

Once installed in the field and connected to a network, these Devices need to establish a unique identity and prove their authenticity with the existing Service components. Following the validation of these authentic devices, activations are provisioned to the devices in order for them to become operational and secure within a CM system. The embodiments herein describe technologies for establishing a unique identity and a root of trust in a CM device (e.g., Root device, Appliance device, or Service device as described herein) during the time of manufacture. The root of trust can be established by a set of keys, each of which has its purposes as described herein. The unique identity and root of trust can be transferred to a Root device using Activation. The embodiments herein describe a provisioning device, also referred to as CRI System Provisioning (CRISP) that performs a device definition process to establish a unique identity and a root of trust of a CM device. CRISP provides the ability to switch the CM system from operating under the authority established by a manufacturer (e.g., Cryptography Research Inc.) to operate using a customer-specific key, referred to as Activation.

A CM infrastructure is a multi-device system of hardware and software designed to fulfill use cases of providing secure chip manufacturing. A CM system in this CM ecosystem is a product that securely generates, processes, and delivers payloads (also referred to as sequences or module sequences) to a CM core. The CM core is a hardware core (e.g. as found in an integrated circuit, chip, SOC, etc.) capable of executing a set of commands, which are the building blocks for delivering functionality to a Product. The result of execution of these commands is the ultimate goal of the CM System. The module is a program, containing both the instructions and the data, execution of which results in a secure construction of a Sequence. The exact instruction set of a Module may be defined as a part of the CM system design.

The CM system typically includes a Root Authority (RA) device, one or more CM Service devices (also referred to as "Service Appliance" or "Service"), one or more Appliance devices (also referred to as "Delegate Appliances" or "Appliance"), Tester Appliances (also referred to as "Tester device" or "Tester"), and one or more CM cores. The RA device is an entity which authorizes installation, configuration and operation of the CM System. For security reasons, the RA device typically does not have a persistent connection to the rest of the devices of the CM system. The Service device is a hardware appliance used to facilitate central management of the CM System. Additionally, the Service device distributes (via Delegate Appliances) command sequences, data and security parameters destined for CM Cores. A Delegate device is an entity to which Root Authority grants a subset of CM Core programming capabilities, allowing incorporation of data unknown to the Root Authority into Sequences destined for CM Cores. For example, a Delegate Appliance device is a server device designed to provide secure computation, digital signing and distribution of Sequences to CM Cores incorporating the data provided by the Delegate entity. The Delegate Appliance typically contains a hardware security module (HSM), which serves both as a vault safeguarding sensitive data and as a platform for execution of a Module delivered via the CM system. Additionally, Delegate Appliance generates, collects, protects, digitally signs and sends a variety of logging information to the customer via the Service device. The Sequence is binary data produced by a Module running on an HSM within a Delegate Appliance and consumed by the CM Core. Secure execution of a Sequence by a CM Core is the main objective of the CM System. The Tester device is an untrusted device, located at the manufacturer's site, used to deliver Sequences to the specific CM Cores. The Tester device can be relied on to initiate the communications with the Delegate Appliance and to provide logging information.

In general, CM devices must be trusted in order to provide the security foundation needed to manage, distribute and program valuable electronic assets on behalf of CRI customers (or customer of a root authority entity). Establishing a root of trust across the CM System that can be used for the authentication of all devices is central to the overall security model of the CM infrastructure. In order to solve the problem of securely establishing and provisioning secure identifiers and credentials, a provisioning device (also referred to as CRISP or CRISP device) can be used. CRISP can be used at a starting point in a lifecycle of any CM Device. Before CRISP can provision any new CM Device, CRISP first creates its own credentials and establishes itself as a Trusted Third Party to both an entity providing assets (e.g., Cryptography Research Inc.) and its customers distributing the assets to CM devices in manufacturing.

FIG. 1 is a diagram illustrating a device definition process 100 performed by an initialization application 101 of a provisioning device 102 associated with a CM system according to one embodiment. The provisioning device 102 (CRISP device) may be an air-gapped server that is operated in a physically secure environment. The provisioning device's role in the overall CM System is to provide the initial authentication of a CM device 106, including device identities and device credentials. The CM device 106 may be a Root Authority (RA) device, a Service device, an Appliance device, or the like. The provisioning device 102 securely generates and distributes credentials, which, for example, are used for establishing mutually authenticated secure shell (SSH) tunnels between Service devices and Appliance devices prior to them being activated. Additionally, provisioning device 102 serves as a distributor of authenticated and integrity protected public information about Devices to the Root Authority device and on to other Devices, such as the Service devices.

In the depicted embodiment, a removable storage device 104 (e.g., a universal serial bus (USB) flash drive) contains an initialization application 101 and storage space to transfer data. The removable storage device 104 is initially inserted into the CM device 106 and the initialization application 101 is executed at a first occurrence. This first step of the device definition process 100 results in generating keys and identifiers (IDs) 107 on the CM device 106. The first step can also result in substituting initial administrator credentials on a HSM with CM initial credentials. The result of the first step of the device definition process 100 is a Device Definition Request 103 being written to the removable storage device 104. During a second step of the device definition process 100, the removable storage device 104 is inserted into the provisioning device 102 (CRISP 102) and the initialization application 101 executed again at a second occurrence. This second step of the device definition process 100 results in an import of the Device Definition Request 103 into the CRISP 102 and an export of a Device Definition Response 105 onto storage space of the removable storage device 104 (USB flash drive). The second step stores information from the Device Definition Request 103 in device data 109 and the Device Definition Response 105 includes CRISP data 111 derived from the device data 109. The removable storage device 104 is unplugged from CRISP 102 and plugged back into the CM device 106. This final step of the device definition process 100 results in an import of the Device Definition Response 105 into the CM device 106. The CM device 106 then stores the keys and IDs 107 and the CRISP data 111. In another embodiment, the initialization application 101 can be part of an initial software image of the CM device 106 itself. For example, the initialization application 101 can be stored in non-transitory storage medium and when the initialization application 101 is executed by the CM device 106, the operations described herein are performed.

Typically, following a CM Device Manufacturing lifecycle stage comes the Device Definition phase in which the Device Definition process 100 can be performed. During the Definition phase, CRISP 102 generates and provisions credentials that can be extended later in the Device's lifecycle to provide confidentiality, data integrity and authentication. For instance, an Appliance Activation key pair (e.g., ApplianceActivationConn key pair), which is used to provide Appliance device credentials for SSH authentication, can be generated on an Appliance Device (in response to the initialization application 101) and a public key of the key pair is sent to CRISP 102 during the Definition phase. As a part of the Definition Phase, a Root Authority device (not illustrated) receives this public key, possibly along with other public keys of this and other kinds. After the Root Authority device has the public key, the Root Authority device can distribute the public key to other devices, such as to a Service Device which can use the public key to securely communicate with Appliance devices.

In one embodiment, CRISP 102 can send definition files to the Root Authority device as part of the Device Definition process 100. Definition files play a major role in establishing secure interactions between CRISP 102, Root Authority devices, Service Devices and Appliance Devices. The Device Definition process 100, as described above, is a process of initial provisioning of devices by CRISP 102 to allow devices to establish necessary authenticated connections during Activation of the devices, as well as to build an inventory of the available devices on a Root Authority device. This list of Devices is what allows Root operators to authorize the CM devices of the CM infrastructure by issuing activation authorizations, deploying Modules and generating and deploying pre-computed data (PCD).

In a further embodiment, the Definition phase can be used to provide Device nonces, one-time-use passwords shared between the Root Authority device and each of the Devices (both Service Devices and Appliances), which allow authentication of Activation messages and delivering encrypted data during Activation. In other embodiments, the Device Definition process 100 can be used for exchanging data between each of the Devices and CRISP 102 (which uses physical proximity for its security) and the exchanged data is used during activation to bootstrap security.

In some implementations, Service Devices and Appliance Devices are shipped to a customer after they have been provisioned by the provisioning device 102 (CRISP) and are able to establish their initial secure connections using the CRISP-issued credentials during the Device Definition process 100. In this non-activated state, Devices may use these connections to receive software upgrades and for other minimal non-operational support actions. In order to allow devices to operate fully, they need to be activated. As described above, the initial credentials needed for the first Authentication operation may be generated by CRISP 102 and provisioned to the CM device 106 during the Definition phase. In parallel, the CRISP-generated credentials (e.g., 107) are also transferred from CRISP 102 to a Root Authority device (also referred to as Root component) (not illustrated). At this time, the credential for each CM device 106 coexists in the CM device 106 to be authenticated and is also stored on the Root Authority device. The CRISP credentials are distributed to a Service device (also referred to as network-facing Service components) to be used in order to authenticate new Devices in the CM system. These CRISP-issued credentials can be used in a CRISP public key infrastructure (PM) domain.

In some implementations, the Root Authority device is to compartmentalize the use of, and minimize reliance on, these initial CRISP-issued (or CRISP-generated) keys. For example, CRISP-issued keys used in the Appliance Device initial provisioning can attest to the rest of the CM System that this particular device originated from the provisioning device 102, but once the Root Authority device has issued its first authorization to an Appliance Device and it has been accepted, the CRISP-issued keys will no longer be relied upon. Thus, the CRISP PKI domain is used only as a means to provide confidence in keys being introduced into CM System. The ability to transfer the root of trust from an entity operating the provisioning device 102 to a customer (Root Authority or Service device) and for this entity to attest that they no longer can leverage the initial credentials is an important property of CRISP 102.

Activation authorizations, as well as all other authorizations issued by the RA device, may be signed files. These signed files may be issued and exported by the Root Authority (RA) device and imported into a Service device. Service activation authorizations are consumed by the Service device, while Appliance activation authorizations are stored by the Service device, and then forwarded to the Appliance devices. In the activation authorization, the RA device includes credentials for the RA's own PKI domain, enabling devices to transition out of the CRISP PM domain into the RA PM domain.

Figure 2:
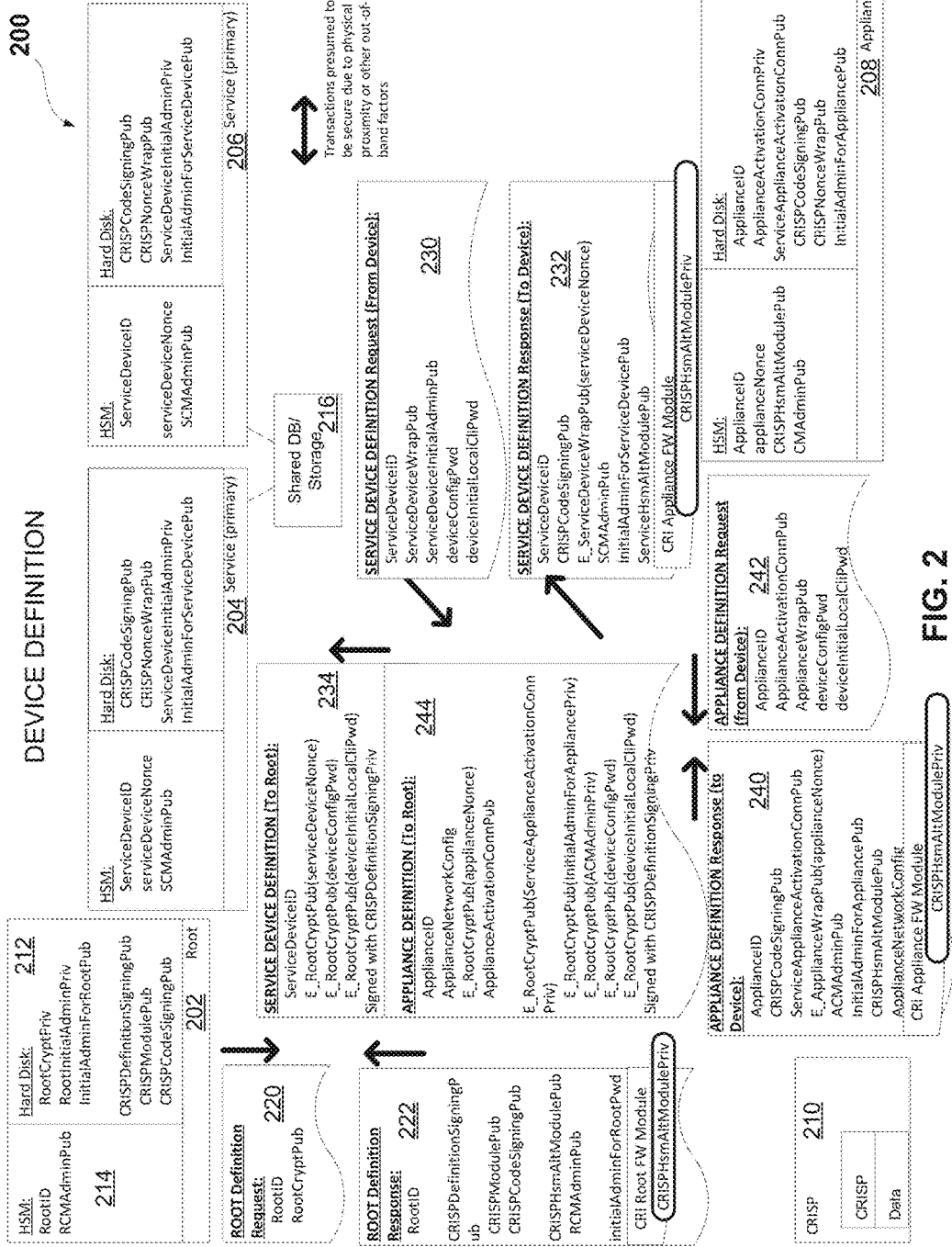
FIG. 2 is a diagram illustrating a Device Definition for a Root Authority device, a Service device, an Appliance device of a CM system according to one embodiment.

FIG. 2 is a diagram illustrating a Device Definition for a Root Authority device, a Service device, and an Appliance device of a CM system 200 according to one embodiment. FIG. 2 shows an example of a CM system 200 containing a Root Authority device 202, a single Service with two Service devices 204, 206, and a single Appliance device 208.

The diagram illustrates provisioning of the IDs and credentials provided by CRISP device 210 before devices are shipped to the customer. CRISP device 210 is illustrated as being separate from these devices of the CM system 200 since the CRISP device 210 is not part of the CM system 200, but provides essential input into the CM system 200. The Root Authority device 202 is depicted as a rectangle in the top left corner with an active partition 212 and an HSM 214. The Service includes two Service Devices 204, 206 and a shared database and file storage 216. Each Service device 204, 206 includes an active partition and HSM. The Appliance device 208 also includes an active partition and HSM.

The Device Definition process of the devices in the CM system 200 includes Device Definition steps for Root Authority (or "Root"), Service, and Appliance devices. Each Device Definition step involves generation of keys, key wrapping (also referred to as signing the request or response with the keys) and exchange of keys and IDs.

In particular, in order to provision the Root Authority device 202, the initialization application is executed on the Root Authority device 202 and CRISP device 210 to generate a root definition request 220 and a root definition response 222, respectively. The initialization application initiates key generation of various keys in the active partition 212, as well as keys in the HSM 214. In one embodiment, the root definition request 220 includes a root identifier (Root ID) and a public root key (RootCryptPub). The public root key may be used to encrypt Nonces and user credentials. The key pair is generated by the Root Authority device 202 and the public key is transferred to CRISP device 210 during manufacturing. The definition response 222 includes at least one of a definition signing public key, a module public key, a code signing public key, a HSM module signing public key, an initial HSM admin public key, and an initial password for the Root Authority device (e.g., InitialAdminForRootPwd). The definition signing public key may be used to encrypt Nonces and user credentials. The module public key may be used to verify signatures on module templates. The code signing public key may be used to verify software update signatures by all devices. The initial HSM admin public key is part of the HSM credentials for root initialization. The initial HSM admin public key and the initial password are not necessarily transferred using the procedure described above, but may be provisioned into the Root Authority device 202 and its HSM 214 as a part of administrator credentials. The root definition response 222 may also include a HSM firmware module that is signed with a private CRISP module key (CRISPHsmAltModule-Priv). The initialization application can install the firmware module on the HSM 214 when verified by HSM. In another embodiment, the firmware module may also be part of an initial software image of the device itself.

In order to provision the Service devices 204, 206, the initialization application of CRISP device 210 is executed on the respective Service device (204, 206) and CRISP device 210 to generate a service definition request 230 and a service definition response 232, respectively. The Service device (204, 206) is configured to distribute at least one of command sequences, data, or security parameters to an Appliance device and the Appliance device is configured to distribute the at least one of the command sequences, data or security parameter to a cryptographic manager core (CM core) of an integrated circuit, such as a chip, SOC, etc. The initialization application initiates key generation of various keys in the active partition, as well as keys in the HSM of the respective device.

In one embodiment, the service definition request 230 includes a Service Device identifier (ServiceID) derived from the respective HSM ID, public keys of two (or more) asymmetric key pairs for a SSH server, one public key to grant initial access to an administrator and another public key to sign a nonce for the Service device, a first password used to secure device configuration, or a second password used by an operator of a device connected to the Service device. The service definition response 232 includes at least one of a code signing public key (used to verify software update signatures by all devices), the nonce signed by the other public key, a SSH client public key, or a HSM module signing public key. The SSH client public key may be used by the Service device (204, 206) to compute a SSH fingerprint and authenticate a client. The service definition response 232 may also include an Appliance HSM firmware module that is signed with a private CRISP module key (CRISPHsmAltModulePriv). The initialization application can install the appliance firmware module on the HSM when verified by HSM of the Service device (204, 206).

In a further embodiment, CRISP device 210 can transfer a definition file for the Appliance device 208 to the Root Authority device 202. The definition file provides information about the Appliance device 208 to be shipped to a customer. The Root Authority device 202 adds the Appliance device 208 to the model.

In a further embodiment, CRISP device 210 can transfer a definition file 234 for each one of the Service devices 204, 206 to the Root Authority device 202. The definition file 234 provides information about the Service devices 204, 206 to be shipped to a customer. In other words, Root Authority device 202 needs to build a model of the devices whose operation it will authorize and to which the Root Authority device 202 will provide assets. An initial set of the Definition files may be transferred to the Root Authority device 202 during manufacturing. At a later time, if additional devices are shipped to the customer, their Definition files need to be transferred to Root Authority device 202. The definition file may be transferred in a message and the message may be signed with a definition signing public key (CRISPDefinitionSigningPub). In a further embodiment, the definition file 234 includes at least one of the Service device IDs, the nonce encrypted by a public root key (RootCryptPubl), the first password encrypted by the public root key, or the second password encrypted by the public root key.

In order to provision the Appliance device 208, the initialization application of CRISP device 210 is executed on the respective Appliance device 208 and CRISP device 210 to generate an appliance definition request 240 and an appliance definition response 242, respectively. As described above, the Appliance device is configured to distribute the at least one of the command sequences, data or security parameter to a CM core The initialization application initiates key generation of various keys in the active partition, as well as keys in the HSM of the respective device.

In one embodiment, the appliance definition request 240 includes an Appliance Device identifier (Appliance ID) derived from the respective HSM ID, public keys of two asymmetric key pairs for a SSH server, one public key to grant initial access to an administrator and another public key to sign a nonce for the Appliance device, a first password used to secure Appliance device configuration, or a second password used by an operator of a device connected to the Appliance device 208. The Appliance definition response 242 includes at least one of a code signing public key (used to verify software update signatures), a SSH client public key (used by the Appliance device to compute a SSH fingerprint and authenticate a client) of SSH server executing on the Appliance device, the nonce encrypted by the other public key, an HSM initial admin credential, or a HSM module signing public key. The appliance definition response 242 may also include an appliance firmware module that is encrypted with a private CRISP module key (CRISPHsmAltModulePriv). The initialization application can install the appliance firmware module on the HSM when verified by HSM of the Appliance device 208.

In a further embodiment, CRISP device 210 can transfer a definition file 244 for the Appliance device 208 to the Root Authority device 202. The definition file 244 provides information about the Appliance device 208 to be shipped to a customer. The Root Authority device 202 adds the Appliance device 208 to the model. The definition file 244 includes the Appliance device ID and a public key of a key pair used to provide Appliance credentials for SSH authentication. The public key is transferred from the Root Authority device 202 to a Service device (204 or 206) to securely communicate with the Appliance device 208. The definition file may be transferred in a message and the message may be signed with a definition signing public key (CRISPDefinitionSigningPub). In a further embodiment, the definition file 244 includes at least one of the Appliance device ID, an Appliance network configuration of the Appliance device, the nonce signed by a public root key (RootCryptPubl used to encrypt nonces and user credentials), a SSH client private key by a SSH client running on the Service device signed by the public root key, a SSH client private key by the SSH client, an HSM initial admin credential signed by the public root key, the first password signed by the public root key, or the second password signed by the public root key. SSH, as described herein, may be used for two different purposes. One purpose is to provide an authenticated and private channel between Service and Appliance devices. The other is to allow a human administrator to log into the device. SSH server is an agent that allows SSH client to connect to it securely, typically for the purposes of running a higher level protocol using this SSH tunnel. SSH client is an application allowing its user (human or software agent) to initiate and establish a connection to an SSH client for the purposes of running a higher level protocol, e.g. shell.

As described herein, CRISP device 210 serves as a distributor of authenticated public information about devices to Root Authority device 202 and on to other devices (204, 206, and 208). For instance, ApplianceActivationConn key pair is used to provide Appliance credentials for SSH authentication. This key pair is generated on an Appliance device 208 and its public key is sent to CRISP device 210 during definition. As a part of definition, Root Authority device 202 receives this public key and is distributed to the Service device (204 or 206), which can use the public key to securely communicate with the Appliance device 208.

Figure 3:
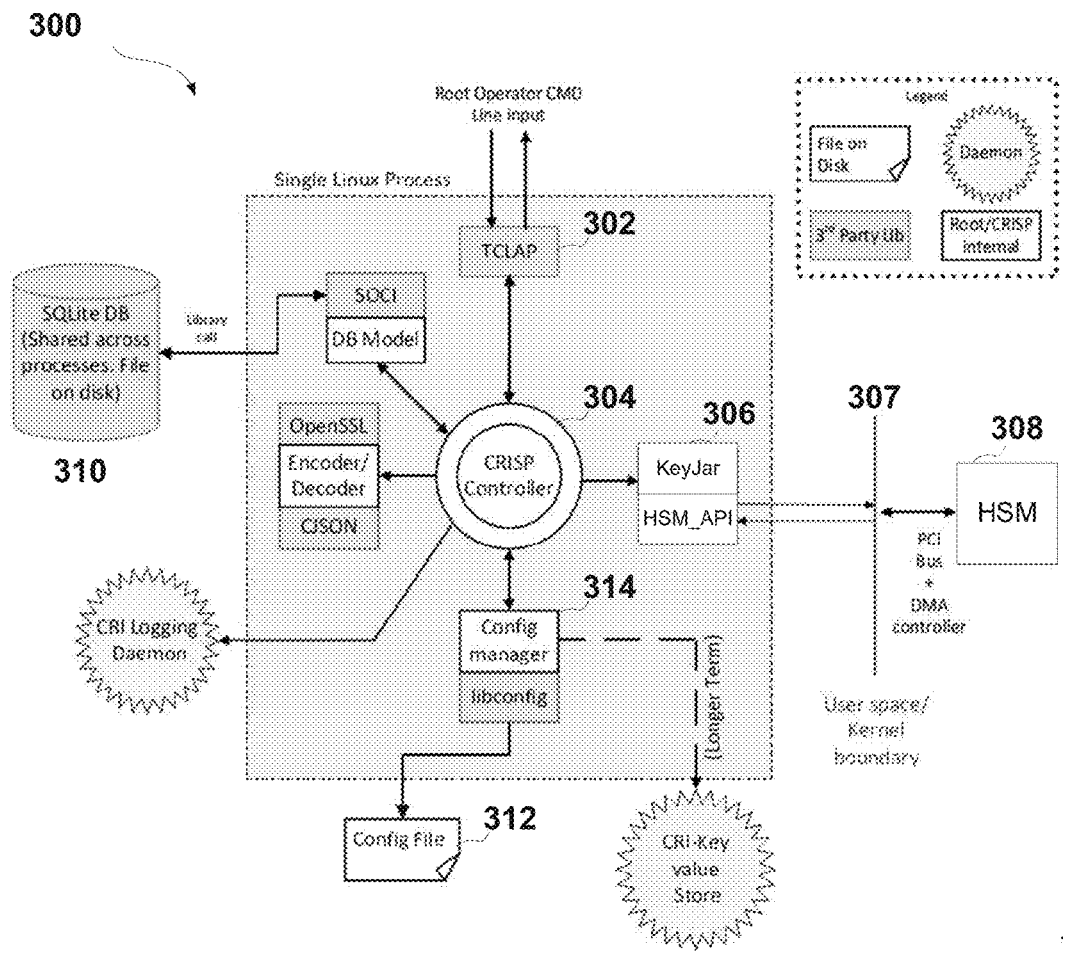
FIG. 3 is a block diagram illustrating an architecture of a provisioning device command line tool according to one embodiment.

FIG. 3 is a block diagram illustrating an architecture of a provisioning device command line tool 300 according to one embodiment. The provisioning device command line tool (CRISP command line tool) 300 receives root operator commands at command line interface (CLI) 302 (e.g., TCLAP is a small, flexible library that provides an interface for command line arguments). A CRISP controller 304 is coupled to receive commands from the CLI 302. The CRISP controller 304 performs various operations and interacts with other components of the provisioning device command line tool 300, such as key jar 306, HSM 308, database 310, configuration file 312, configuration manager 314, as described below with respect to FIGS. 4-9. The following description refers to components of the provisioning device command line tool 300 of FIG. 3.

Figure 4:
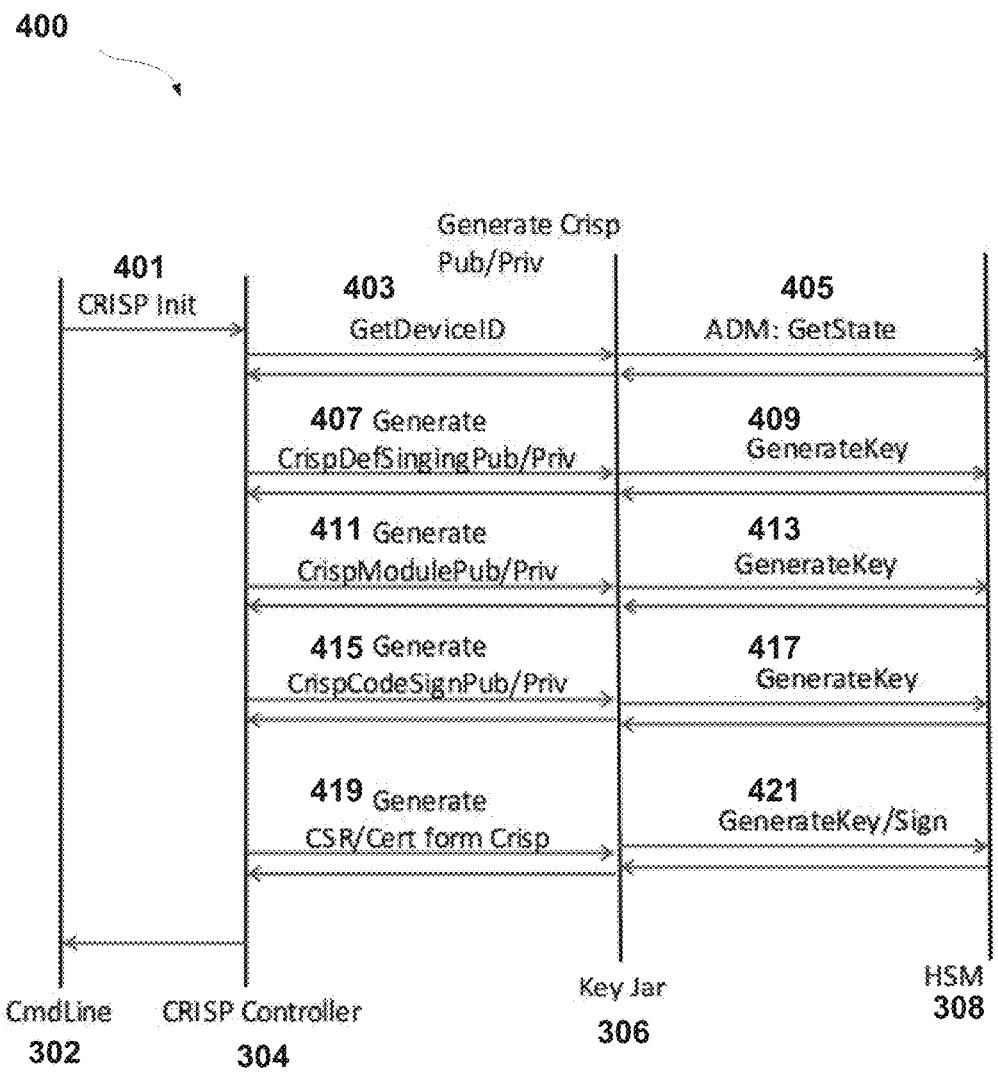
FIG. 4 is a flow diagram illustrating a method of initializing the provisioning device with a trusted third party according to one embodiment.

As described herein, CRISP is the starting point in the life-cycle of any CM-Device. Before CRISP can provision any new device, CRISP first creates its own credentials and establishes itself as a Trusted Third Party. This process is called CRISP-INIT. FIG. 4 shows the flow of messages that take place during CRISP-INIT.

FIG. 4 is a flow diagram illustrating a method 400 of initializing the provisioning device with a trusted third party according to one embodiment. Method 400 may be performed by processing logic that may comprise hardware (e.g., circuitry, dedicated logic, programmable logic, microcode, etc.), software, firmware or a combination thereof. In one implementation, provisioning device command line tool 300 performs method 400. In other implementations, method 400 is performed by provisioning device 102 of FIG. 1, initialization application 101 of FIG. 1, or the CRISP device 210 of FIG. 2. Alternatively, other components of the devices described herein may perform some or all of the operations of the method 400.

Referring to FIG. 4, the method 400 begins with the CLI 302 sending a CRISP-INIT command 401 to the CRISP controller 304. The CRISP controller 304 sends a GetDeviceID command to the key jar 306, which obtains the device ID 405 from the HSM 308 (e.g., ADM: GetState). The CRISP controller 304 sends a GetDeviceID command to the key jar 306, which obtains the device ID 405 from the HSM 308 (e.g., Abstract Data Management (ADM): GetState). The CRISP controller 304 sends a first generate command (CrispDefSigningPub/Priv) 407 to the key jar 306, which instructs the HSM 308 to generate a first key pair for a definition signing key pair 409 (GenerateKey). This is an asymmetric key pair. The CRISP controller 304 sends a second generate command (CrispModulePub/Priv) 411 to the key jar 306, which instructs the HSM 308 to generate a second key pair for a module key pair 413 (GenerateKey). This is an asymmetric key pair. The CRISP controller 304 sends a third generate command (CrispCodeSigniPub/Priv) 415 to the key jar 306, which instructs the HSM 308 to generate a third key pair for a code signing key pair 417 (GenerateKey). This is an asymmetric key pair. The CRISP controller 304 sends a fourth generate command (CSR/Cert from Crisp) 419 to the key jar 306, which instructs the HSM 308 to generate a certificate signing request (CSR) and a certificate (CSR) 421 from CRISP keys (GenerateKey/Sign). The CRISP controller 304 returns control back to the CLI 302. It should be noted that only the public keys of the asymmetric key pairs are available outside of the HSM 308 (beyond the user space/kernel boundary) 307. In another embodiment, CRISP may not be used as a Certificate Authority as described above.

Figure 5:
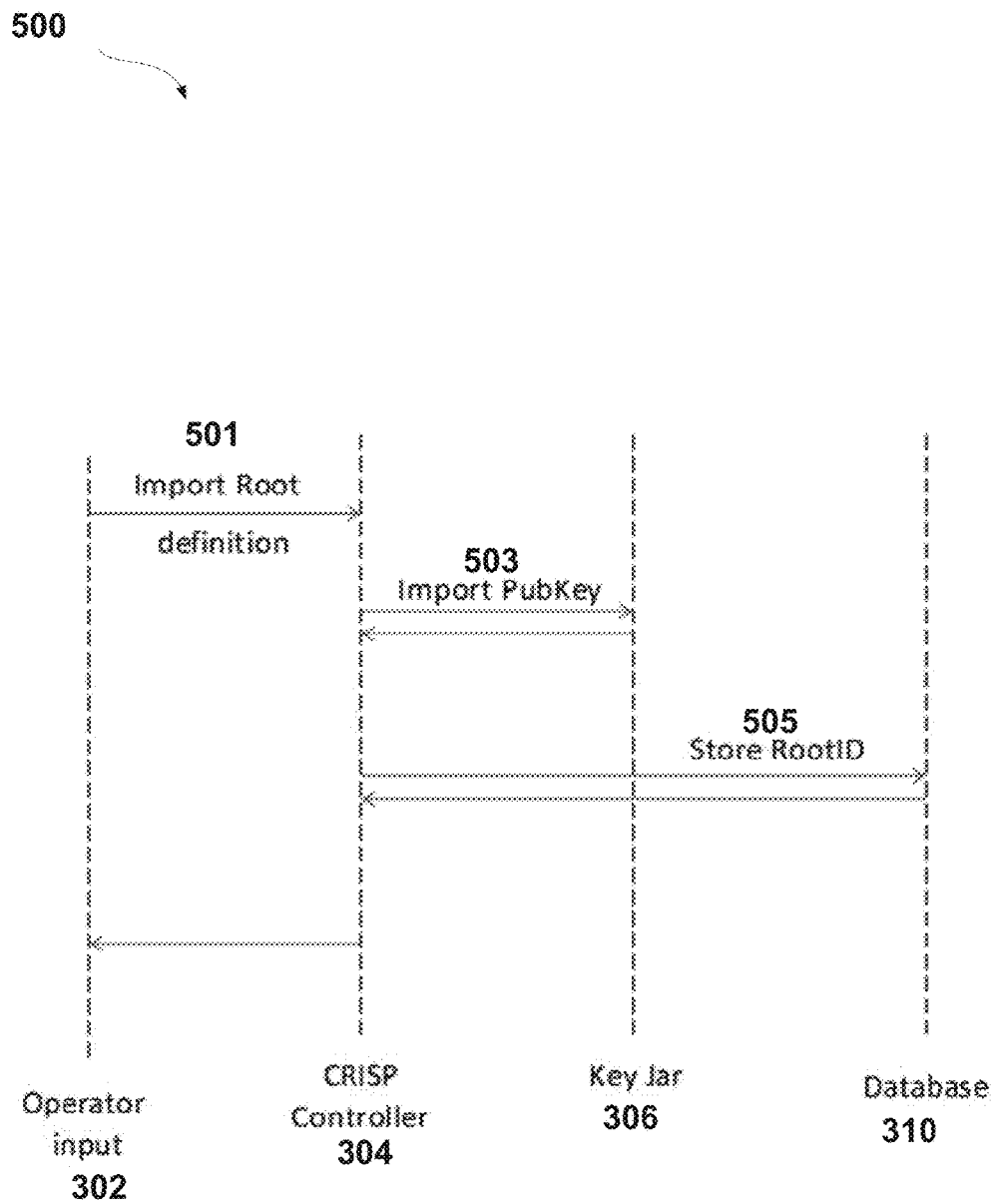
FIG. 5 is a flow diagram illustrating a Root Definition import process according to one embodiment.

After CRISP-INIT, one or more Root Authorities can provide their Public Key to CRISP for establishing an offline secure channel between Root Authority and CRISP. FIG. 5 below shows the process Root Definition Import. It should be noted that the process of Root Definition generation is similar to other devices.

FIG. 5 is a flow diagram illustrating a Root Definition import process according to one embodiment. Method 500 may be performed by processing logic that may comprise hardware (e.g., circuitry, dedicated logic, programmable logic, microcode, etc.), software, firmware or a combination thereof. In one implementation, provisioning device command line tool 300 performs method 500. In other implementations, method 500 is performed by provisioning device 102 of FIG. 1, initialization application 101 of FIG. 1, or the CRISP device 210 of FIG. 2. Alternatively, other components of the devices described herein may perform some or all of the operations of the method 500.

Referring to FIG. 5, the method 500 begins when the CRISP controller 304 receives an import root definition 501. In response, the CRISP controller 304 sends a command (import PubKey) 503 from the key jar 306 to import a public key 503 from the key jar 306. The CRISP controller 304 also sends a command to the database 310 to store a root ID 505. Once a valid Root ID 505 and Public Key 503 are registered with the CRISP, different CM-Devices (Service and Appliance devices) can be provisioned for bootstrapping the security between the Root Authority device and the respective CM device. It should be noted that the process of Root Definition generation is similar to Service Definition generation and Appliance Definition generation.

Figure 6:
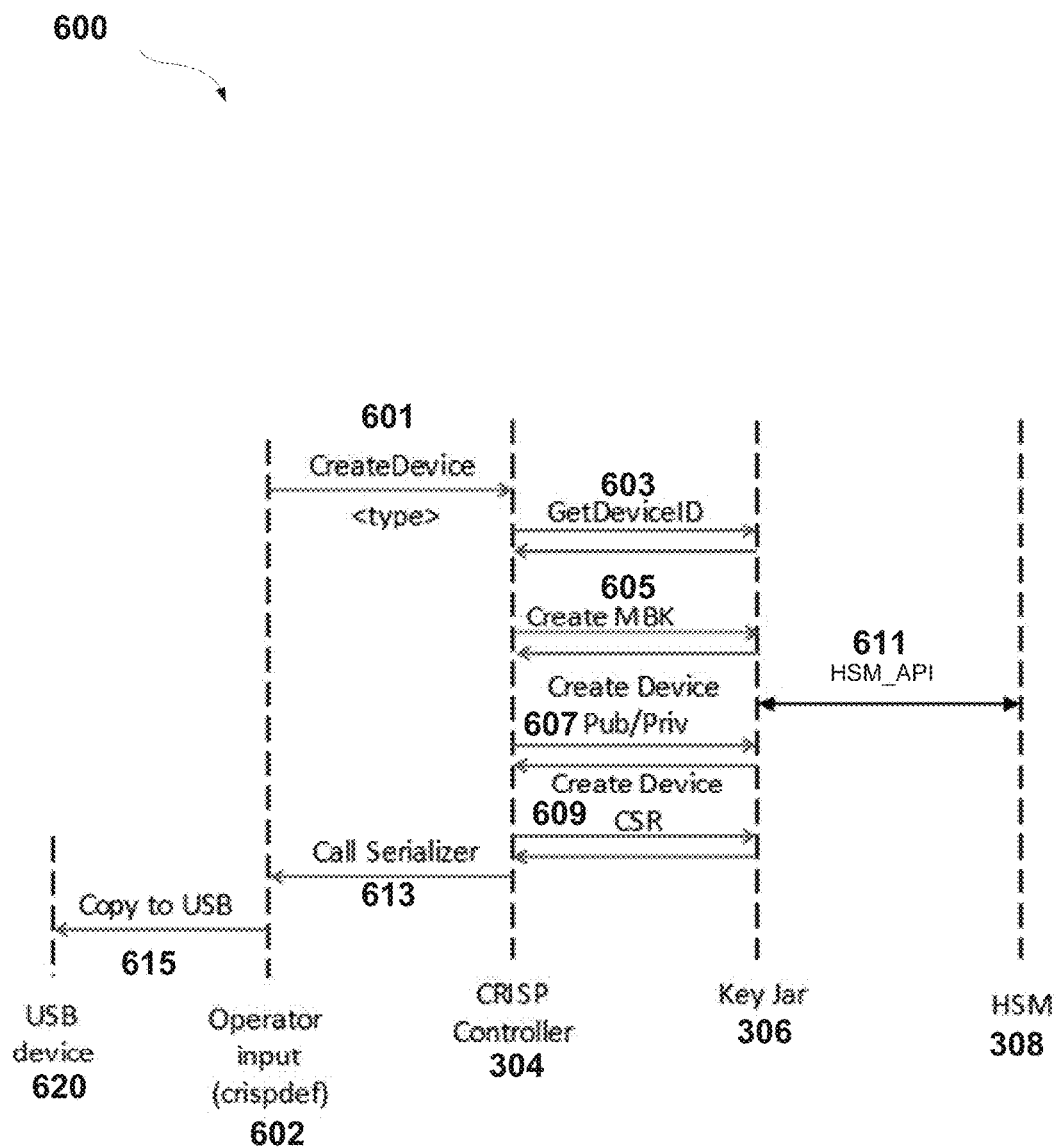
FIG. 6 is a flow diagram illustrating a Device Definition process according to one embodiment.

FIG. 6 is a flow diagram illustrating a Device Definition process according to one embodiment. Method 600 may be performed by processing logic that may comprise hardware (e.g., circuitry, dedicated logic, programmable logic, microcode, etc.), software, firmware or a combination thereof. In one implementation, provisioning device command line tool 300 performs method 600. In other implementations, method 600 is performed by provisioning device 102 of FIG. 1, initialization application 101 of FIG. 1, or the CRISP device 210 of FIG. 2. Alternatively, other components of the devices described herein may perform some or all of the operations of the method 600.

Referring to FIG. 6, the method 600 begins with an initialization application of CRISP executing on a new CM device. The CRISP operation 602 initiates a device definition process by inputting a command (CreateDevice) 601 that is received by the CRISP controller 304. The CRISP operator 602 specifies a type of device (Service Device, or Appliance Device) and the Root-ID under which this new CM device belongs. In response to the command 601, the CRISP controller 304 sends a command (GetDeviceID) 603 to the key jar 306 to obtain a device ID (ServiceID, ApplianceID). The CRISP controller 304 also sends a command (CreateMBK) 605 to the key jar 306 to obtain a master backup key (MBK). The CRISP controller 304 also sends a command (Create Device Pub/Priv) 607 to the key jar 306 to generate an asymmetric key pair. The CRISP controller 304 also sends a command (Create Device CSR) 609 to the key jar 306 to generate a device CSR. The key jar 306 may interact with the HSM over HSM_API 611. The CRISP controller 304 may call a serializer 613 to serialize the data from 603, 605, 607, and 609 and the data 615 is stored on storage space of the removable storage device 620 (USB flash drive) (not illustrated in FIG. 3). The data 615 can be stored in response to a copy operation initiated by a CRISP operator 602, or automatically in response to the command 601.

In another embodiment, the CRISP operator 602 can run a tool, called "CRISPDEF_REQUEST" on a new CM device. The CRISP operator 602 specifies on the tool at 601 a type of device (Service Device, or Appliance Device) and the Root-ID under which this new CM device belongs. In response, the CRISPDEF_REQUEST obtains the unique HSM-ID using the Key Jar 306 and creates an appropriate DEVICE-ID based on operator's device-type input. CRISP-DEF_REQUEST then generates an HSM-Internal RSA-Public/Private Key pair called DEVICEHSMPRIV and DEVICEHSMPUB. The tuple, <DEVICE-ID, ROOT-ID, DEVICEHSMPUB> becomes the core of any Device Definition Request. CRISPDEF_REQUEST then formats this information into a JavaScript Object Notation (JSON) object (with possibly other additional data) and sends it out to the CRISP device to get its bootstrapping credentials. The JSON object can be stored in storage space of the removable storage device 620 to be sent to the CRISP device.

A CRISP operation can take the JSON formatted object (JSON input file) to a machine that runs as CRISP Authority (also referred to as the CRISP device). The CRISP Authority runs a command line tool, called CRISP, and the command line tool takes the JSON input file as a command line argument and performs the following actions as set forth in FIG. 8.

Figure 7:
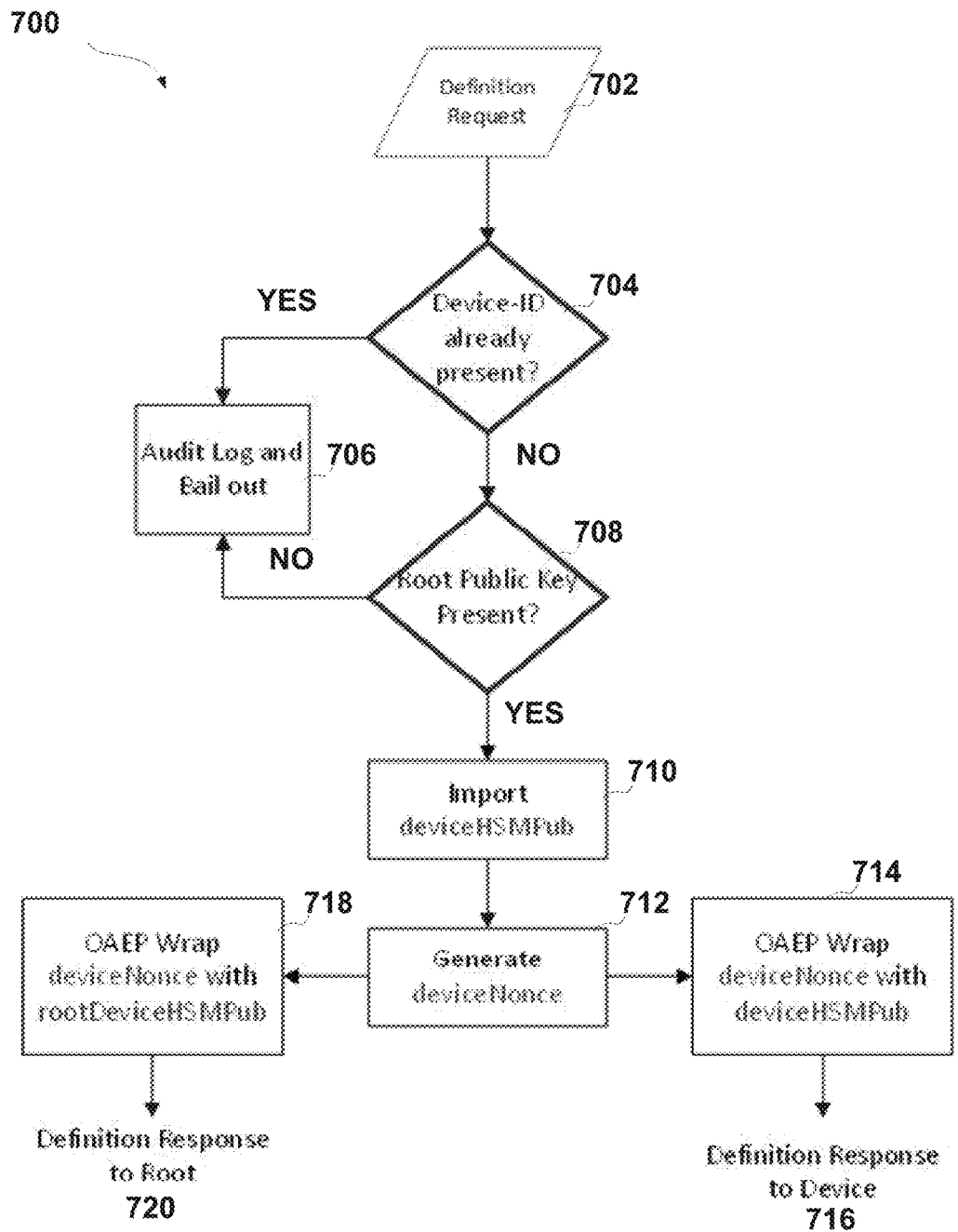
FIG. 7 is a flow diagram illustrating a method of the provisioning device consuming the device definition request and generating a device definition response according to on embodiment.

FIG. 7 is a flow diagram illustrating a method of the provisioning device consuming the device definition request and generating a device definition response according to one embodiment. Method 700 may be performed by processing logic that may comprise hardware (e.g., circuitry, dedicated logic, programmable logic, microcode, etc.), software, firmware or a combination thereof. In one implementation, provisioning device command line tool 300 performs method 700. In other implementations, method 700 is performed by provisioning device 102 of FIG. 1, initialization application 101 of FIG. 1, or the CRISP device 210 of FIG. 2. Alternatively, other components of the devices described herein may perform some or all of the operations of the method 700.

Referring to FIG. 7, the method 700 begins with processing logic receiving a definition request (block 702). The processing logic de-serializes the JSON input file and extracts the tuple <DEVICE-ID, ROOT-ID, DEVICEHSM-PUB> to obtain the device identifier (DEVICE-ID). The processing logic validates that the DEVICE-ID is not already present on CRISP (block 704). The processing logic creates an audit log of the attempt and bails out when the DEVICE-ID is not present (block 706). When the processing logic determines that the device identifier is not already present, the processing logic validates that the ROOT-ID and the corresponding public key is present in the key jar (block 708). If the root keys in CRISP are named as "hsm_int://<root-ID>/rootDeviceHSMPub," then successfully opening the key is a sufficient validation. When the root public key is not present, the processing logic creates the audit log and bails out at block 706. After CRISP has validated the request at block 708, the processing logic imports a device HSM public key (deviceHSMPub) from the key jar (as hsm_ext://<device-ID>/deviceHSMPub) (block 710). The processing logic generates a device nonce (block 712). In one embodiment, CRISP creates an AES256 key called "hsm_ext://<device-ID>/deviceNonce," which is the shared secret between (a) CRISP, (b) Root and (c) the given CM device in the field, and provides a means to securely add additional credentials to the device after it has been deployed in the field. In order to securely transport the deviceNonce to the Root Authority device, the processing logic (CRISP OAEP) encrypts hsm_ext://<device_id>/deviceNonce using RootCryptPub. In order to securely transport the deviceNonce to the CM-Device itself, the processing logic (CRISP OAEP) wraps hsm_ext://<device_id>/deviceNonce using deviceHSMPub (block 714) and creates a Device Definition Response for Device (with additional Public Key and certificate related data (block 716). The processing logic (CRISP OAEP) wraps hsm_ext://<device_id>/deviceNonce once again using rootDeviceHSMPub (block 718) and creates a Device Definition Response for Root (with additional Public Key and certificate related information) (block 720). In one embodiment, the processing logic wraps the device nonce at blocks 714 and 718 with Optimal Asymmetric Encryption Padding (OAEP) with the respective key. OAEP is a padding scheme used together with RSA encryption. At the end of the invocation, CRISP may generate two separate JSON files: One for Root Authority device to consume, and another one for the CM-Device (which would still be present at CRISP facility). The Definition Response for Root Authority device needs to be transmitted to the Root Authority device. The Definition Response for Device needs to be sent back to the Device.

Figure 8:
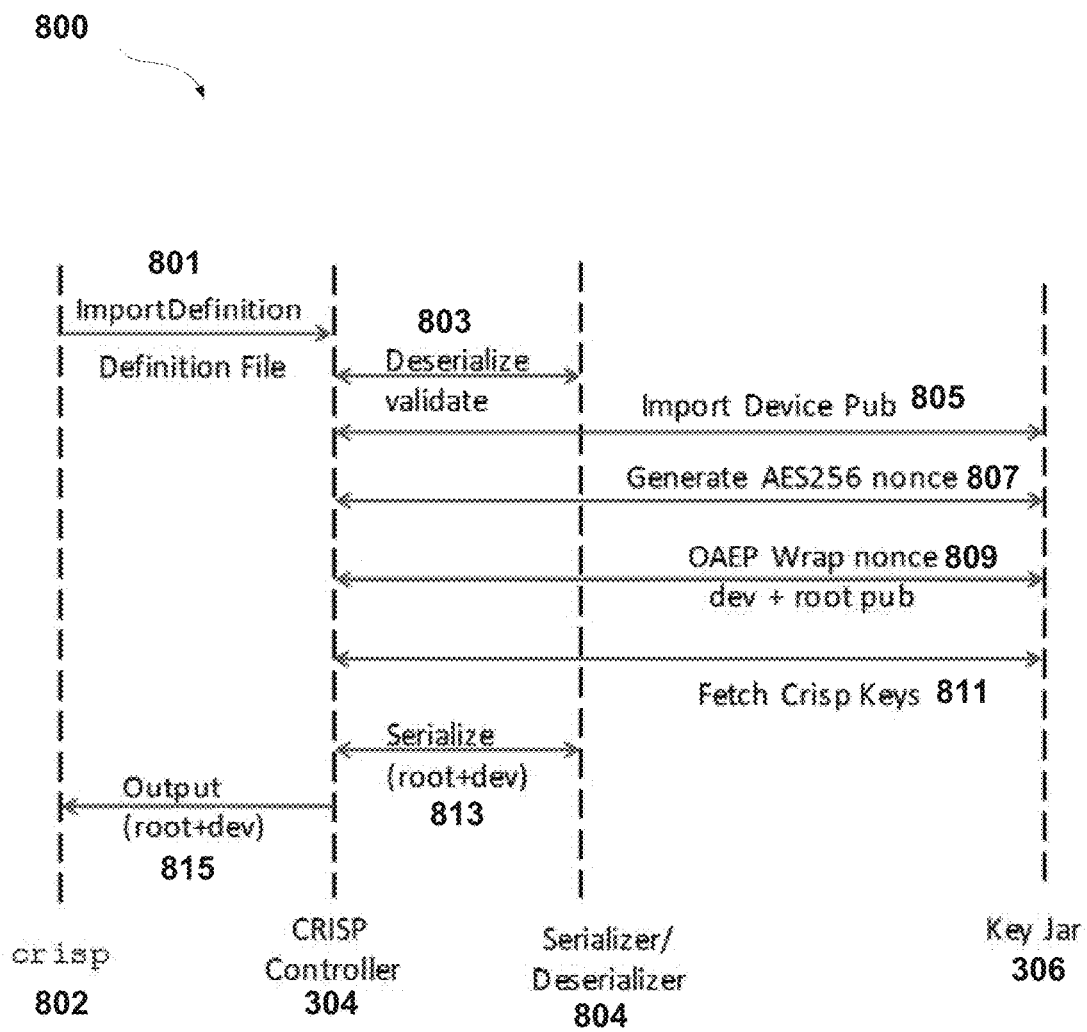
FIG. 8 is a flow diagram illustrating a message flow of device definition request consumption and device definition response generation according to one embodiment.

FIG. 8 is a flow diagram illustrating a message flow of device definition request consumption and device definition response generation according to one embodiment. Method 800 may be performed by processing logic that may comprise hardware (e.g., circuitry, dedicated logic, programmable logic, microcode, etc.), software, firmware or a combination thereof. In one implementation, provisioning device command line tool 300 performs method 800. In other implementations, method 800 is performed by provisioning device 102 of FIG. 1, initialization application 101 of FIG. 1, or the CRISP device 210 of FIG. 2. Alternatively, other components of the devices described herein may perform some or all of the operations of the method 800.

Referring to FIG. 8, the method 800 begins with a CRISP operator 802 importing the import definition file 801. The CRISP controller 304 receives the import definition file and sends a command to the serializer/de-serializer 804 to de-serialize 803 the import definition file and the CRISP controller 304 validates the import definition file. Upon validation, the CRISP controller 304 interacts with the key jar 306 to import the device public key (805). The CRISP controller 304 also sends a command to generate a device nonce (AES256 key) 807, a command to wrap 809 the device nonce with the device public key and the root public key, and a command to fetch the CRISP keys 811. The CRISP controller 304 sends a command to the serializer/de-serializer 804 to serialize the wrapped nonce 813 and outputs 815 the wrapped nonce to the CRISP operator 802. For the Device Definition request consumption and Device Definition Response generation message flow, the key jar 306 interacts with HSM via HSM_API. The CRISP operator 802 inputs the definition file from the removable storage device (e.g., USB flash device).

Figure 9:
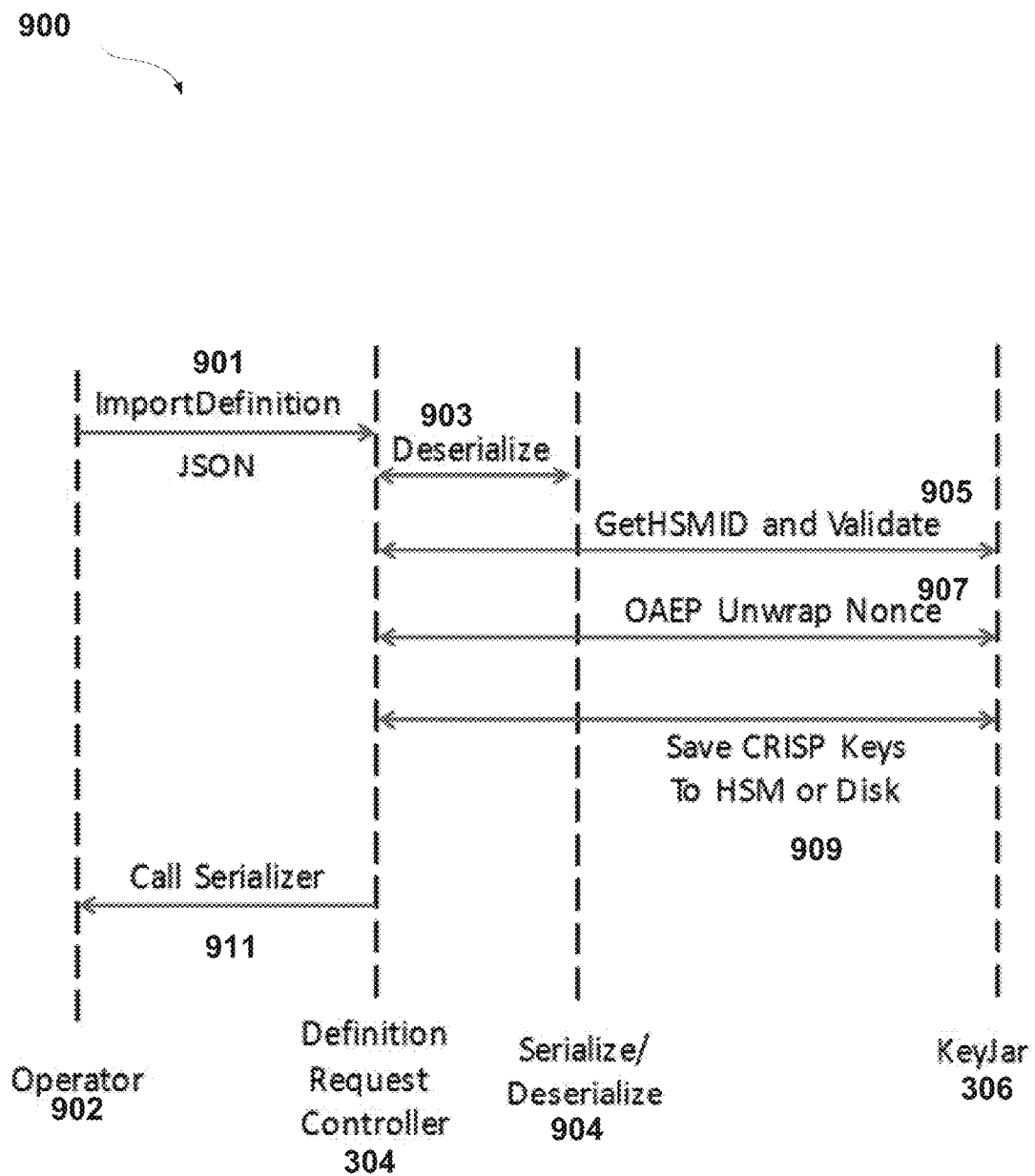
FIG. 9 is a flow diagram illustrating a method of the CM device consuming the device definition response according to one embodiment.

The CRISP operator needs to carry over the Definition Response for Device back to the device where it was generated and rerun CRISP_IMPORT to add the device Nonce keys to its HSM. FIG. 9 describes operations of a process of importing the device nonce on the CM device.

FIG. 9 is a flow diagram illustrating a method of the CM device consuming the device definition response according to one embodiment. Method 900 may be performed by processing logic that may comprise hardware (e.g., circuitry, dedicated logic, programmable logic, microcode, etc.), software, firmware or a combination thereof. In one implementation, provisioning device command line tool 300 performs method 900. In other implementations, method 900 is performed by provisioning device 102 of FIG. 1, initialization application 101 of FIG. 1, or the CRISP device 210 of FIG. 2. Alternatively, other components of the devices described herein may perform some or all of the operations of the method 900.

Referring to FIG. 9, the method 900 begins with the CRISP operator 902 importing the import definition file (JSON object) of the Definition Response 901. The CRISP controller 304 receives the import definition file and sends a command to the serializer/de-serializer 904 to de-serialize 903 the import definition file. The CRISP controller 304 sends a command (GETHSMID) to obtain the HSM ID and validate the DeviceID present in the Definition Response 901 with one generated in HSM. In one embodiment, the device may keep its deviceID in a configuration file 312 after the first run (first occurrence) using a configuration manager 314 that interacts with the CRISP controller 304. The CRISP controller 304 (CRISP_IMPORT) should open the HSM private key (deviceHSMPriv) through the key jar 306 and the CRISP controller 304 (OAEP) unwraps 907 the key with the encrypted device Nonce (hsm_only://deviceNonce" as the key URL). Since OAEP is non-malleable, any accidental or malicious tampering with the encrypted deviceNonce would result in a failure to unwrap the key. For both failed unwrap and successful unwrap, the device should Audit Log the entire content of the JSON response as part of the log file. This should be the first Audit Log of any device. Any subsequent Audit log of the device can be used to indicate tampering or some other error.

After a successful unwrap (OAEP Unwrap succeeds), the device is no longer in a CRISP_IMPORT state. At this point, the CRISP_IMPORT should populate the certificate stores with the certificates and private keys that came from CRISP. This can be done by the CRISP controller 304 saving the CRISP keys to HSM or disk 909 via the key jar 306. The CRISP controller 304 calls the serializer 911 when saving to disk. For the Device Response consumption message flow, the key jar 306 interacts with HSM via HSM_API. The CRISP operator 802 inputs the definition file from the removable storage device (e.g., USB flash device).

Figure 10:
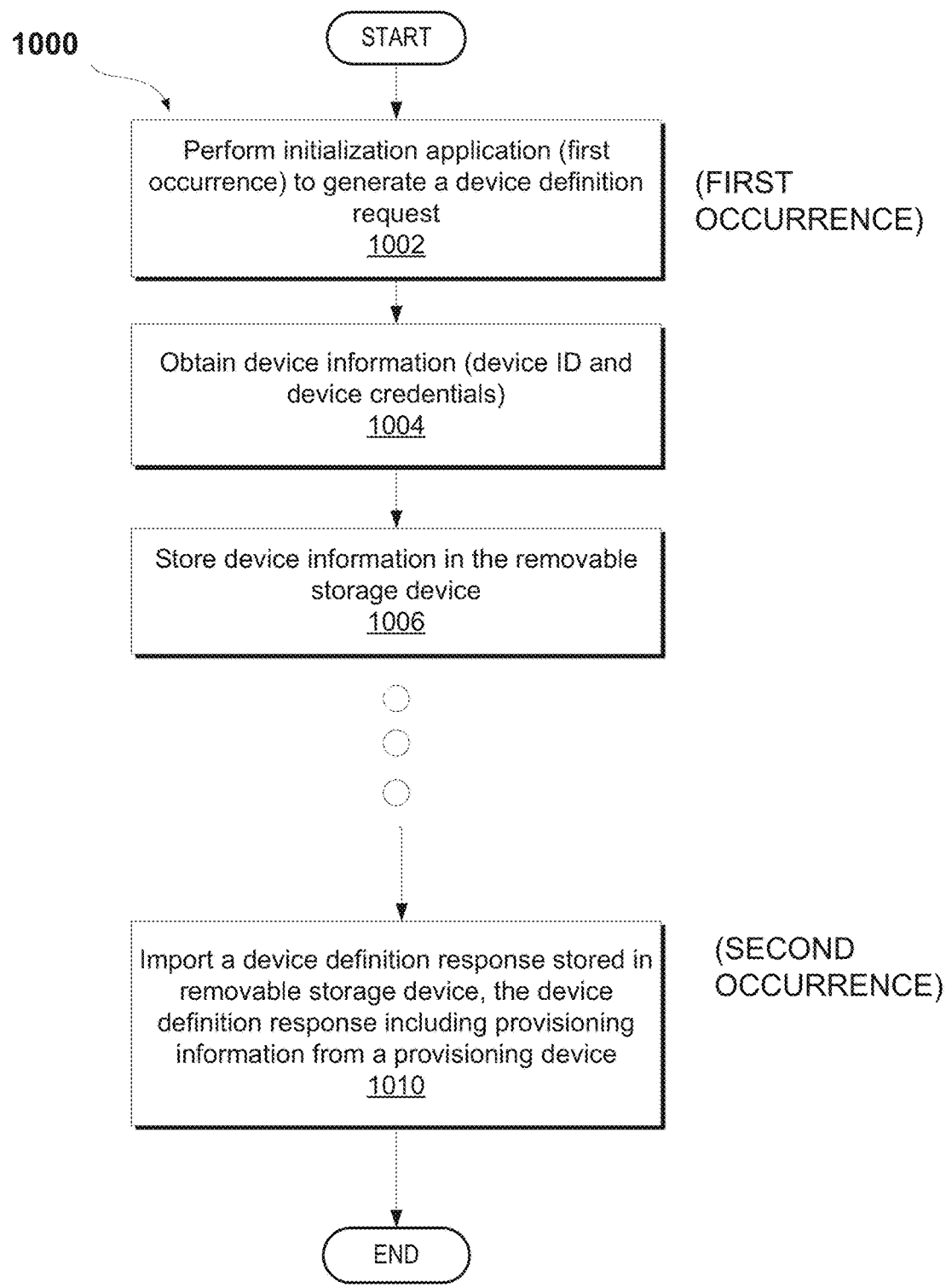
FIG. 10 is a flow diagram of a method of establishing a unique identity and a root of trust of a CM device by a provisioning device according to an embodiment.

FIG. 10 is a flow diagram of a method 1000 of establishing a unique identity and a root of trust of a CM device by a provisioning device according to an embodiment. Method 1000 may be performed by processing logic that may comprise hardware (e.g., circuitry, dedicated logic, programmable logic, microcode, etc.), software, firmware or a combination thereof. In implementations, method 1000 is performed by provisioning device 102 of FIG. 1, initialization application 101 of FIG. 1, or the CRISP device 210 of FIG. 2. Alternatively, other components of the devices described herein may perform some or all of the operations of the method 1000.

Referring to FIG. 10, the method 1000 begins with processing logic of a CM device executing an initialization application at a first occurrence stored in a removable storage device plugged into the CM device. The processing logic performs a device definition process to generate a device definition request to establish a unique identity and a root of trust of the CM device (block 1002). The CM device is to be deployed in a CM system. In response to the device definition request, the processing logic obtains device information, including device identity and device credentials of the CM device (block 1004). The processing logic stores the device definition request with the device information in storage space of the removable storage device (block 1006). The processing logic executes the initialization application on the CM device at a second occurrence to import a device definition response stored in the storage space of the removable storage device (block 1008). The device definition response includes provisioning information generated by a provisioning device associated with the CM system in response to the device definition request (block 1010) and the method 1000 ends.

In a further embodiment, the processing logic obtains the device information by obtaining a device identifier (ID) from a HSM of the CM device for the device identity and instructs the HSM to generate an asymmetric key pair, including a public key and a private key. The public key is part of the credentials of the CM device that can be shared with other devices. In another embodiment, the processing logic executes the initialization application to install a firmware module on the HSM of the CM device. In another embodiment, the firmware module may also be part of an initial software image of the CM device itself.

In a further embodiment, the CM device is a Root Authority device, and the processing logic receives a definition file for each one of a Service device or an Appliance device in the CM system. The Root Authority device is configured to authorize at least one of installation, configuration, or operation of the CM system The Service device is configured to distribute at least one of command sequences, data, or security parameters to the Appliance device. The Appliance device is configured to distribute the at least one of the command sequences, data, or security parameters to a cryptographic manager core of the CM device during a later manufacturing stage (in an untrusted environment). In other embodiments where the CM device is a Service device or an Appliance device, the processing logic transfers a definition file for the CM device to a Root Authority device.

In another embodiment, the processing logic receives a message containing a CM module signed by a HSM module private key. The HSM module private key (and HSM module public key) may be generated by the HSM in response to instructions by the initialization application during the device definition process. The processing logic verifies the message by the HSM module public key. The processing logic installs the CM module on the HSM of the CM device when verified. For example, the CM module is what may be installed on an Appliance device's HSM in order to support a particular customer use case. Firmware Module provides an execution environment for CM Modules on the Appliance's HSM. Firmware Module is installed as part of device definition, before it is sent out to a customer.

In another embodiment, in response to the device definition request, the processing logic configures HSM credentials of a HSM of the CM device and a HSM module signing public key for the CM device. The processing logic generates a message (a device definition request message) with the device definition request and stores the message in the storage space of the removable storage device. In a further embodiment, the processing logic, before generating the message, derives a Service device identifier from a HSM identifier and generates two or more asymmetric key pairs on the CM device. The multiple asymmetric key pairs may be server SSH key pairs used by the CM device to grant initial access to an administrator and to decrypt a device nonce when the device nonce is transferred from the initialization application to the CM device. The processing logic exports the public keys of the multiple asymmetric key pairs as part of the message. After importing the device definition response, the processing logic transfers a second message signed with a definition signing private key. The second message can include a definition file of the CM device. In one embodiment, the device nonce (serviceDeviceNonce) and other sensitive data may be sent to the Root Authority device in encrypted form and the second message is signed with a definition signing key (CRISPDefinitionSigningPriv) to provide message authentication.

Figure 11:
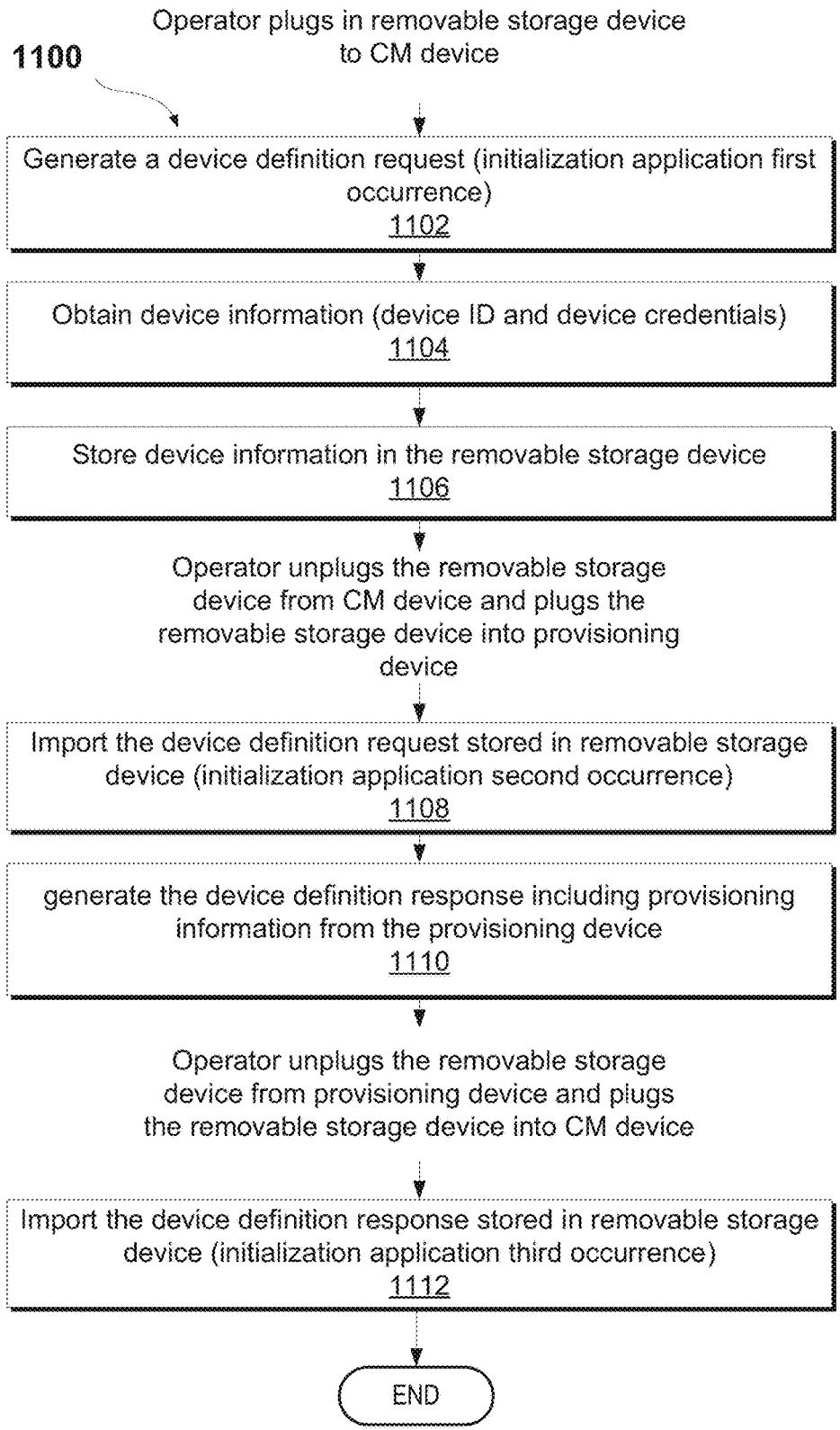
FIG. 11 is a flow diagram of a method 1100 of establishing a unique identity and a root of trust of a CM device by a provisioning device according to another embodiment.

FIG. 11 is a flow diagram of a method 1100 of establishing a unique identity and a root of trust of a CM device by a provisioning device according to another embodiment. Method 1100 may be performed by processing logic that may comprise hardware (e.g., circuitry, dedicated logic, programmable logic, microcode, etc.), software, firmware or a combination thereof. In implementations, method 1100 is performed by provisioning device 102 of FIG. 1, initialization application 101 of FIG. 1, or the CRISP device 210 of FIG. 2. Alternatively, other components of the devices described herein may perform some or all of the operations of the method 1100.

Referring to FIG. 11, the method 1100 begins with processing logic, in response to an operator of a provisioning system plugging in in a removable storage device to a CM device, generating a device definition request to establish a unique identity and a root of trust of the CM device (block 1102). The removable storage device can store an initialization application that is executed by the CM device at a first occurrence to generate the device definition request. Alternatively, the initialization application can be stored on the CM device itself. In response to the device definition request, the processing logic obtains device information, including device identity and device credentials of the CM device (block 1104). The processing logic stores the device definition request with the device information in available storage space of the removable storage device (block 1106). Once stored in the removable storage device, the operator can unplug the removable storage device from the CM device and plug the removable storage device into the provisioning device (CRISP device). In response, the processing logic imports the device definition request stored in the removable storage device (block 1108). The processing logic generates a device definition response with provisioning information associated with a CM system in which the CM device is to be deployed (block 1110). In one embodiment, the initialization application is executed on the CM device at a second occurrence to import the device definition request at block 1108 and to generate the device definition response at block 1110. The removable storage device can store the initialization application and it can be executed by the provisioning device in a second occurrence. Alternatively, a different instance of the initialization application already stored on the provisioning device can be executed to import the device definition request. Once the device definition response is stored in the removable storage device, the operator can unplug the removable storage device from the provisioning device and plug the removable storage device into the CM device again. In response, the processing logic imports the device definition response stored in the removable storage device (block 1112), and the method 1100 ends. In one embodiment, the processing logic executes the initialization application at a third occurrence to import the device definition response at block 1112.

In a further embodiment, the processing logic obtains the device information by obtaining a device identifier (ID) from a HSM of the CM device for the device identity and instructs the HSM to generate an asymmetric key pair, including a public key and a private key. The public key is part of the credentials of the CM device that can be shared with other devices. In another embodiment, in response to the device definition request, the processing logic substitutes initial administrator credentials on a HSM of the CM device with CM initial credentials.

As described herein, the CM device can be a Root Authority device, a Service device, or an Appliance device.

In one embodiment where the CM device is the Root Authority device, the definition process is a root definition process in which the device definition request include a root identifier (Root ID) and a public root key (RootCryptPubl). The device definition response includes one or more of a definition signing public key, a module public key, a code signing public key, a HSM module signing public key, an initial HSM admin public key, or an initial password for the Root Authority device.

In another embodiment where the CM device is a Service device, the definition process is a Service Device definition process in which the device definition request includes a Service Device identifier (Service device ID) derived from a HSM ID, public keys of two asymmetric key pairs for a SSH server, one public key to grant initial access to an administrator and another public key to sign a nonce for the Service device, a first password used to secure device configuration, or a second password used by an operator of a device connected to the Service device. The device definition response may include at least one of a code signing public key, the nonce signed by the other public key, a SSH client public key, or a HSM module signing public key. The processing logic of the Service device (e.g., initialization application executing on the Service device) transfers a message comprising a definition file for the Service device to a Root Authority device in the CM system, the definition file including at least one of the Service device ID, the nonce signed by a public root key (RootCryptPubl), the first password signed by the public root key, or the second password signed by the public root key. The processing logic can sign the message with a definition signing public key.

In another embodiment where the CM device is an Appliance device, the definition process is an appliance device definition process in which the device definition request includes an Appliance Device identifier (Appliance device ID) derived from a HSM ID, public keys of two asymmetric key pairs for a SSH server, one public key to grant initial access to an administrator and another public key to sign a nonce for the Appliance device, a first password used to secure Appliance device configuration, and a second password used by an operator of a device connected to the Appliance device. The device definition response includes at least one of a code signing public key, a SSH client public key of SSH server executing on the Appliance device, the nonce signed by the other public key, an HSM initial admin credential, or a HSM module signing public key. The processing logic of the Appliance device (e.g., initialization application executing on the Appliance device) transfers a message containing a definition file for the Appliance Device to a Root Authority device in the CM system. The definition file may include at least one of the Appliance device ID, an Appliance network configuration of the Appliance device, the nonce signed by a public root key (Root-CryptPubl), a SSH client private key by a SSH client running on the Service device signed by the public root key, a SSH client private key by the SSH client ran by an initial human admin, an HSM initial admin credential signed by the public root key, the first password signed by the public root key, or the second password signed by the public root key. The processing logic can sign the message with a definition signing public key. In another embodiment, the definition file may include the Appliance device ID and a public key of a key pair used to provide Appliance credentials for SSH authentication. The public key may be transferred from the Root Authority device to a Service device to securely communicate with the Appliance device.

In one embodiment, the processing logic of the Appliance device (e.g., initialization application executing on the Appliance device at a subsequent occurrence) applies an Appliance network configuration to the Appliance device. In another embodiment, the processing logic of the Appliance device receives a message containing a CM module signed by a HSM module private key. The processing logic verifies the message by a HSM module public key and installs the CM module on the HSM of the Appliance device.

In a further embodiment, the processing logic of the CM device (e.g., initialization application at a subsequent occurrence) can transfer a definition file for each one of a Service device or an Appliance device in the CM system to the Root Authority device. As described herein, the processing logic can install a firmware module on any of the HSMs of the Root Authority device, or Appliance device.

Figure 12:
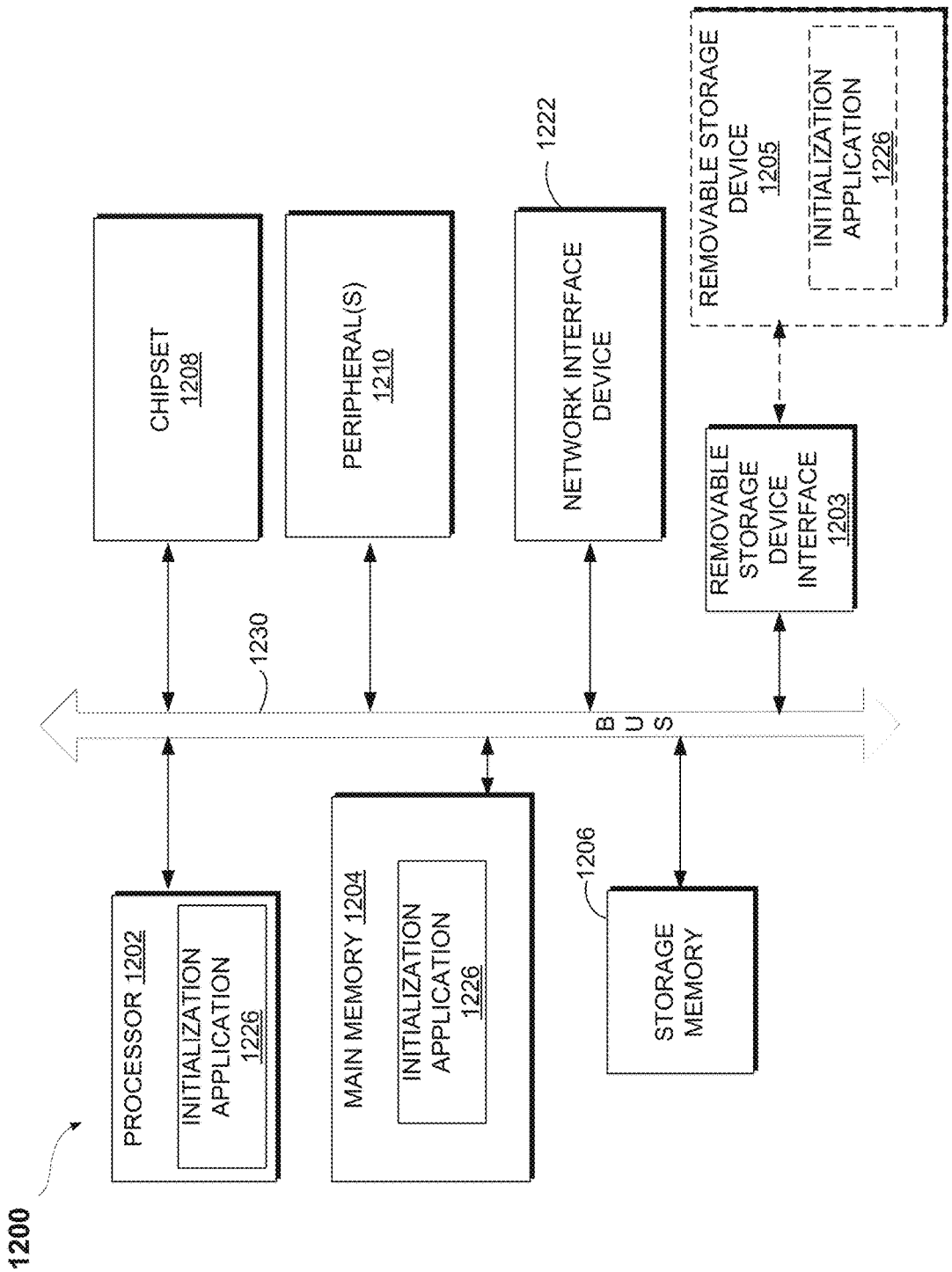
FIG. 12 is a diagram of one embodiment of a computer system, including a processor and a removable storage device interface to connect to a removable storage device for a device definition process according to one embodiment.

FIG. 12 is a diagram of one embodiment of a computer system 1200, including a processor 1202 and a removable storage device interface 1203 to connect to a removable storage device 1205 for a device definition process according to one embodiment. The removable storage device interface 1203 is configured to connect to the removable storage device 1205. The processor 1202 is operable to execute an initialization application 1226 in a device definition phase of a manufacturing lifecycle of a CM device. The initialization application 1226 may include instructions that are stored in main memory 1204 or in removable storage device 1805 and executed by the processor 1202 to perform various operations of a device definition process to generate a device definition request to establish a unique identity and a root of trust of the CM device as described herein. The initialization application generates a device definition request that obtains device information from the CM device, such as device identity and device credentials. The initialization application 1226 stores the device definition request with the device information in storage space of the removable storage device 1205. The initialization application 1226 can also import a device definition response stored in the storage space of the removable storage device 1205. The device definition response contains provisioning information generated by a provisioning device associated with a CM system in response to the device definition request.

In other embodiments, the computer system 1200 represents the provisioning device that receives the device definition request and generates the device definition response with the provisioning information as described herein.

The computer system 1200 in some cases may be connected (e.g., networked) to other machines in a LAN, an intranet, an extranet, or the Internet. The computer system 1200 can be a host in a cloud, a cloud provider system, a cloud controller, a server, a client, or any other machine. The computer system 1200 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1200 includes a processor 1202 (e.g., host processor or processing device), a main memory 1204 (e.g., read-only memory (ROM), flash memory, dynamic random access memory (DRAM), a storage memory 1206 (e.g., flash memory, static random access memory (SRAM), etc.), and a secondary memory 1218 (e.g., a data storage device in the form of a drive unit, which may include fixed or removable computer-readable storage medium), which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like.

In one embodiment, the processor 1202 may reside on a first integrated circuit and the main memory 1204 may reside on a second integrated circuit. For example, the integrated circuit may include a host computer (e.g., CPU having one more processing cores, L1 caches, L2 caches, or the like), a host controller or other types of processors 1202. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device. For example, the memory device may be a single IC or a multi-IC module including any combination of single IC devices on a common integrated circuit substrate. The components of FIG. 12 can reside on "a common carrier substrate," such as, for example, an integrated circuit ("IC") die substrate, a multi-IC module substrate or the like. Alternatively, the memory device may reside on one or more printed circuit boards, such as, for example, a mother board, a daughter board or other type of circuit card. In other implementations, the main memory and processor 1202 can reside on the same or different carrier substrates.

The computer system 1200 may include a chipset 1208, which refers to a group of integrated circuits, or chips, that are designed to work with the processor 1202 and controls communications between the processor 1202 and external devices. For example, the chipset 1208 may be a set of ICs on a motherboard that links the processor 1202 to very high-speed devices, such as main memory 1204 and graphic controllers, as well as linking the processing device to lower-speed peripheral buses of peripherals 1210, such as USB, PCI or ISA buses. In one embodiment, the removable storage device interface 1203 can be implemented in the chipset 1208.

The computer system 1200 may further include a network interface device 1222. The computer system 1200 also may include one or more peripherals 1210, such as a video display unit (e.g., a liquid crystal display (LCD)) connected to the computer system through a graphics port and graphics chipset, an alphanumeric input device (e.g., a keyboard), a cursor control device (e.g., a mouse), a signal generation device (e.g., a speaker), or the like.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer-readable storage medium to store an initialization application that, when executed by a cryptographic manager (CM) device, causes the CM device to perform operations comprising:
    performing, by the initialization application executing on the CM device at a first occurrence, a device definition process to generate a device definition request to establish a unique identity and a root of trust of the CM device, the CM device to be deployed in a CM system;
    in response to the device definition request, obtaining device information comprising device identity and device credentials of the CM device and storing the device definition request with the device information in storage space of a removable storage device, wherein the device information comprises a device identifier and a public key of an asymmetric key pair stored at the CM device; and
    importing, by the initialization application executing on the CM device at a second occurrence, a device definition response stored in the storage space of the removable storage device, the device definition response comprising provisioning information generated by a provisioning device associated with the CM system in response to the device definition request, and wherein the provisioning information comprises a device nonce encrypted with the public key, a certificate, and a second private key of a second asymmetric key pair.

2. The non-transitory computer-readable storage medium of claim 1, wherein obtaining the device information comprises:
    obtaining, by the initialization application, the device ID from a hardware security module (HSM) of the CM device for the device identity; and
    instructing, by the initialization application, the HSM to generate the asymmetric key pair comprising the public key and a private key, wherein the public key is part of the credentials of the CM device.

3. The non-transitory computer-readable storage medium of claim 1, wherein the operations further comprise installing, by the initialization application, a firmware module on a hardware security module (HSM) of the CM device.

4. The non-transitory computer-readable storage medium of claim 1, wherein the operations further comprises receiving by the CM device a definition file for each one of a Service device or an Appliance device in the CM system, wherein the Service device is a first type of device in the CM system that distributes at least one of command sequences, data, or security parameters to the Appliance device, wherein the Appliance device is a second type of device in the CM system that distributes the at least one of the command sequences, data, or security parameters to a cryptographic manager core.

5. The non-transitory computer-readable storage medium of claim 1, wherein the operations further comprise transferring, by the initialization application, a definition file for the CM device to a Root Authority device, wherein the Root Authority device is a third type of device in the CM system that authorizes at least one of installation, configuration or operation of the CM system.

6. A non-transitory computer-readable storage medium to store an initialization application that, when executed by a cryptographic manager (CM) device, causes the CM device to perform operations comprising:
    performing, by the initialization application executing on the CM device at a first occurrence, a device definition process to generate a device definition request to establish a unique identity and a root of trust of the CM device, the CM device to be deployed in a CM system;
    in response to the device definition request, obtaining device information comprising device identity and device credentials of the CM device and storing the device definition request with the device information in storage space of a removable storage device; and
    importing, by the initialization application executing on the CM device at a second occurrence, a device definition response stored in the storage space of the removable storage device, the device definition response comprising provisioning information generated by a provisioning device associated with the CM system in response to the device definition request;
    receiving, by the initialization application, a message containing a CM module signed by a hardware security module (HSM) module private key;
    verifying the message by a HSM module public key; and
    installing, by the initialization application, the CM module on a HSM of the CM device.

7. The non-transitory computer-readable storage medium of claim 1, further comprising:
    in response to the device definition request, configuring initial hardware security module (HSM) credentials of a HSM of the CM device,
configuring a HSM module signing public key for the CM device,
generating a message with the device definition request, and
storing the message in the storage space of the removable storage device.

8. The non-transitory computer-readable storage medium of claim 7, further comprising:
before generating the message,
deriving a Service device identifier from a HSM identifier,
generating a plurality of asymmetric key pairs on the CM device, wherein the plurality of asymmetric key pairs are used by the CM device to grant initial access to an administrator and to decrypt the device nonce when the device nonce is transferred from the initialization application to the CM device, and
exporting public keys of the plurality of asymmetric key pairs as part of the message; and
after importing the device definition response, transferring a second message signed with a definition signing private key, wherein the second message comprises a definition file of the CM device.

9. A method comprising:
performing, by an initialization application executing on a cryptographic manager (CM) device at a first occurrence, a device definition process to generate a device definition request to establish a unique identity and a root of trust of the CM device, the CM device to be deployed in a CM system;
in response to the device definition request,
obtaining, by the initialization application, device information comprising device identity and device credentials of the CM device; and
storing the device definition request with the device information in storage space of a removable storage device, wherein the device information comprises a device identifier and a public key of an asymmetric key pair stored at the CM device;
importing, by the initialization application executing on a provisioning device associated with a CM system at a second occurrence, the device definition request with the device information;
generating, by the initialization application executing on the provisioning device at the second occurrence, a device definition response with provisioning information associated with the CM system, wherein the generating the device definition response comprises:
generating a device nonce;
encrypting the device nonce with the public key from the device definition request, wherein the provisioning information comprises the device nonce encrypted with the public key, a certificate, and a second private key of a second asymmetric key pair; and
importing, by the initialization application executing on the CM device at a third occurrence, the device definition response.

10. The method of claim 9, wherein obtaining the device information comprises:
obtaining, by the initialization application, the device ID from a hardware security module (HSM) of the CM device for the device identity; and
instructing, by the initialization application, the HSM to generate the asymmetric key pair comprising the public key and a private key, wherein the public key is part of the credentials of the CM device.

11. The method of claim 9, wherein the CM device is a Root Authority device, wherein the Root Authority device is a first type of device in the CM system that authorizes at least one of installation, configuration or operation of the CM system, wherein the definition process is a root definition process in which the device definition request comprises a root identifier (Root ID) and a public root key (RootCryptPubl) and in which the device definition response comprises at least one of a definition signing public key, a module public key, a code signing public key, a hardware security module (HSM) module signing public key, an initial HSM admin public key, or an initial password for the Root Authority device.

12. The method of claim 11, further comprising installing, by the initialization application, a firmware module on a HSM of the Root Authority device.

13. The method of claim 11, further comprising transferring, by the initialization application at a subsequent occurrence, a definition file for each one of a Service device or an Appliance device in the CM system to the Root Authority device, wherein the Service device is to execute instructions to distribute at least one of command sequences, data, or security parameters to the Appliance device, wherein the Appliance device is to execute instructions to distribute the at least one of the command sequences, data, or security parameters to a cryptographic manager core.

14. The method of claim 9, wherein the CM device is a Service device, wherein the Service device is a second type of device in the CM system that distributes at least one of command sequences, data, or security parameters to an Appliance device, wherein the Appliance device is a third type of device in the CM system that distributes the at least one of the command sequences, data or security parameter to a cryptographic manager core (CM core), wherein the definition process is a Service Device definition process in which the device definition request comprises a Service Device identifier (Service device ID) derived from a hardware security module (HSM) identifier (HSM ID), public keys of a plurality of asymmetric key pairs for a SSH server, one public key to grant initial access to an administrator and another public key to encrypt a nonce for the Service device, a first password used to secure device configuration, or a second password used by an operator of a device connected to the Service device, and wherein the device definition response comprises at least one of a code signing public key, the nonce signed by the other public key, a SSH client public key, or a HSM module signing public key.

15. The method of claim 14, further comprising transferring, by the initialization application, a message comprising a definition file for the Service device to a Root Authority device in the CM system, wherein the definition file comprises at least one of the Service device ID, the nonce encrypted by a public root key (RootCryptPubl), the first password signed by the public root key, or the second password signed by the public root key, and wherein the message is signed with a definition signing public key.

16. The method of claim 9, wherein the CM device is an Appliance device, wherein the Appliance device is a first type of device in the CM system that distributes at least one of command sequences, data, or security parameters to a cryptographic manager core, wherein the definition process is an Appliance Device definition process in which device definition request comprises an Appliance Device identifier (Appliance device ID) derived from a hardware security module (HSM) identifier (HSM ID), public keys of a plurality of asymmetric key pairs for a SSH server, one public key to grant initial access to an administrator and another public key to sign a nonce for the Appliance device, a first password used to secure Appliance device configuration, and a second password used by an operator of a device connected to the Appliance device, and wherein the device definition response comprises at least one of a code signing public key, a SSH client public key of SSH server executing on the Appliance device, the nonce signed by the other public key, an HSM initial admin credential, or a HSM module signing public key.

17. The method of claim 16, further comprising applying, by the initialization application, an Appliance network configuration to the Appliance device.

18. The method of claim 16, further comprising:
receiving, by the initialization application, a message containing a firmware module signed by a hardware security module (HSM) module private key;
verifying the message by a HSM module public key; and
installing, by the initialization application, the firmware module on a HSM of the Appliance device.

19. The method of claim 16, further comprising transferring, by the initialization application, a message comprising a definition file for the Appliance Device to a Root Authority device in the CM system, wherein the Root Authority device is a second type of device in the CM system that authorizes at least one of installation, configuration or operation of the CM system, wherein the definition file comprises at least one of the Appliance device ID, an Appliance network configuration of the Appliance device, the nonce encrypted by a public root key (RootCryptPubl), a SSH client private key by a SSH client running on a Service device signed by the public root key, a SSH client private key by the SSH client ran by an initial human administrator, an HSM initial admin credential signed by the public root key, the first password signed by the public root key, or the second password signed by the public root key, and wherein the message is signed with a definition signing public key.

20. The method of claim 18, further comprising transferring, by the initialization application, a message comprising a definition file for the Appliance device to a Root Authority device in the CM system, wherein the Root Authority device is a second type of device in the CM system that authorizes at least one of installation, configuration or operation of the CM system, wherein the definition file comprises the Appliance device ID and a public key of a key pair used to provide Appliance credentials for SSH authentication, wherein the public key is transferred from the Root Authority device to an Service device to securely communicate with the Appliance device.

21. The method of claim 9, further comprising, in response to the device definition request, substituting initial administrator credentials on a hardware security module (HSM) of the CM device with CM initial credentials.

22. A cryptographic manager (CM) device comprising:
a processor; and
a removable storage device interface configured to connect to a removable storage device, wherein the removable storage device interface is coupled to the processor, wherein the processor is operable to execute an initialization application in a device definition phase of a manufacturing lifecycle of the CM device, the initialization application to:
perform a device definition process to generate a device definition request to establish a unique identity and a root of trust of the CM device;
obtain device information in response to the device definition request, the device information comprising device identity and device credentials of the CM device, wherein the device information comprises a device identifier and a public key of an asymmetric key pair stored at the CM device;
store the device definition request with the device information in storage space of the removable storage device; and
import a device definition response stored in the storage space of the removable storage device, the device definition response containing provisioning information generated by a provisioning device associated with a cryptographic manager (CM) system in response to the device definition request, wherein the provisioning information comprises a device nonce encrypted with the public key, a certificate, and a second private key of a second asymmetric key pair.

23. The CM device of claim 22, wherein the CM device is at least one of a Root Authority device, a Service device, or an Appliance device, wherein
the Root Authority device is a first type of device in the CM system that authorizes at least one of installation, configuration or operation of the CM system, wherein the Service device is a second type of device in the CM system that distributes at least one of command sequences, data, or security parameters to the Appliance device, wherein the Appliance device is a third type of device in the CM system that distributes the at least one of the command sequences, data, or security parameters to a cryptographic manager core.

24. The CM device of claim 22, wherein the initialization application is stored on the removable storage device.

* * * * *